US012621564B2

(12) United States Patent
Sivaraman et al.

(10) Patent No.: US 12,621,564 B2
(45) Date of Patent: May 5, 2026

(54) SELECTIVE OPERATING MODE SWITCHING FOR VISIBLE AND INFRARED IMAGING

(71) Applicant: NVIDIA Corporation, Santa Clara, CA (US)

(72) Inventors: Sakthivel Sivaraman, Sunnyvale, CA (US); Rajath Shetty, Sunnyvale, CA (US); Animesh Khemka, Fremont, CA (US); Niranjan Avadhanam, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/494,138

(22) Filed: Oct. 25, 2023

(65) Prior Publication Data

US 2025/0142208 A1 May 1, 2025

(51) Int. Cl.
| | |
|---|---|
| *H04N 23/667* | (2023.01) |
| *B60R 1/20* | (2022.01) |
| *H04N 23/11* | (2023.01) |
| *H04N 23/83* | (2023.01) |

(52) U.S. Cl.
CPC ............. *H04N 23/667* (2023.01); *B60R 1/20* (2022.01); *H04N 23/11* (2023.01); *H04N 23/83* (2023.01); *B60R 2300/70* (2013.01)

(58) Field of Classification Search
CPC ......... H04N 23/667; H04N 23/11; B60R 1/20
See application file for complete search history.

(56) References Cited

U.S. PATENT DOCUMENTS

| | | | |
|---|---|---|---|
| 10,885,698 B2 | 1/2021 | Muthler et al. | |
| 2019/0287272 A1 | 9/2019 | Wu | |
| 2020/0007767 A1* | 1/2020 | Park | H04N 23/71 |
| 2020/0112662 A1* | 4/2020 | Sakamoto | H04N 23/73 |
| 2020/0322581 A1 | 10/2020 | Lundgren et al. | |
| 2022/0133241 A1 | 5/2022 | Jones et al. | |

(Continued)

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

(Continued)

*Primary Examiner* — Boubacar Abdou Tchoussou
(74) *Attorney, Agent, or Firm* — Freestone Intellectual Property Law PLLC

(57) ABSTRACT

In various examples, an image processing pipeline may switch between different operating or switching modes based on speed of ego-motion and/or the active gear (e.g., park vs. drive) of a vehicle or other ego-machine in which an RGB/IR camera is being used. For example, a first operating or switching mode that toggles between IR and RGB imaging modes at a fixed frame rate or interval may be used when the vehicle is in motion, in a particular gear (e.g., drive), and/or traveling above a threshold speed. In another example, a second operating or switching mode that toggles between IR and RGB imaging modes based on detected light intensity may be used when the vehicle is in stationary, in park (or out of gear), and/or traveling below a threshold speed.

20 Claims, 14 Drawing Sheets

(56) References Cited

U.S. PATENT DOCUMENTS

| 2023/0166661 | A1 | 6/2023 | Hung | |
| 2024/0020992 | A1* | 1/2024 | Barth | ..................... G06V 40/23 |
| 2024/0062388 | A1* | 2/2024 | Lind | ..................... H04N 23/12 |

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).

ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.

IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.

U.S. Appl. No. 17/736,648, filed May 4, 2022.

Non-Final Office Action, U.S. Appl. No. 18/494,010, Notification Date: Jul. 7, 2025, 20 pages.

Final Office Action, U.S. Appl. No. 18/494,010, Notification Date: Nov. 14, 2025, 20 pages.

Non-Final Office Action, U.S. Appl. No. 18/494,010, Notification Date: Mar. 12, 2026, 19 pages.

* cited by examiner

500
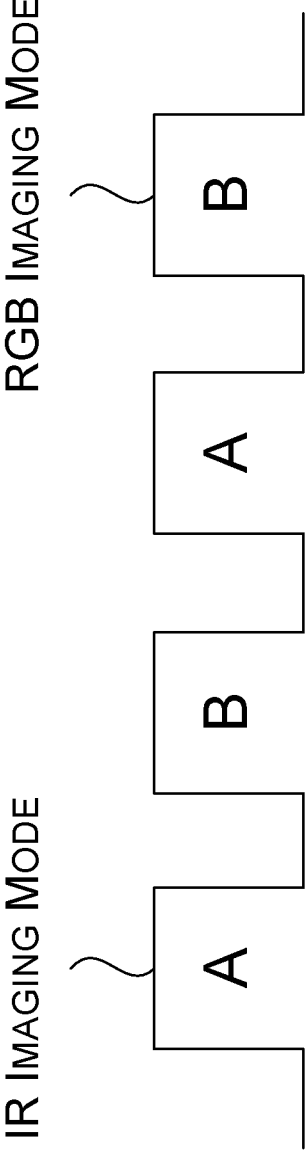
IR IMAGING MODE
RGB IMAGING MODE
FIGURE 5

600

GENERATE A FIRST FRAME OF RGB IMAGE DATA BASED AT LEAST ON OPERATING AN IMAGE PROCESSING PIPELINE IN AN RGB IMAGING MODE
B602

BASED AT LEAST ON DETECTING THAT A FIRST AMOUNT OF LIGHT INTENSITY ASSOCIATED WITH THE FIRST FRAME OF RGB IMAGE DATA IS LESS THAN A FIRST INTENSITY THRESHOLD, SWITCH TO OPERATING THE IMAGE PROCESSING PIPELINE IN AN IR IMAGING MODE TO GENERATE A SECOND FRAME OF INFRARED (IR) IMAGE DATA
B604

BASED AT LEAST ON DETECTING THAT A SECOND AMOUNT OF LIGHT INTENSITY ASSOCIATED WITH THE SECOND FRAME OF IR IMAGE DATA EXCEEDS A SECOND INTENSITY THRESHOLD, SWITCH TO OPERATING THE IMAGE PROCESSING PIPELINE IN THE RGB IMAGING MODE
B606

FIGURE 6

800

OPERATE AN IMAGE PROCESSING PIPELINE OF AN
EGO-MACHINE IN A FIRST OPERATING MODE THAT
TOGGLES BETWEEN AN RGB IMAGING MODE AND AN
INFRARED (IR) IMAGING MODE AT A FIXED RATE
B802

BASED AT LEAST ON A SPEED OR AN ACTIVE GEAR OF
THE EGO-MACHINE, SWITCH TO OPERATING THE IMAGE
PROCESSING PIPELINE IN A SECOND OPERATING MODE
THAT TOGGLES BETWEEN THE RGB IMAGING MODE AND
THE IR IMAGING MODE BASED AT LEAST ON AN AMOUNT
OF DETECTED LIGHT INTENSITY
B804

FIGURE 8

SERVER(S) 978

CPU 980(B)

PCIE SWITCH 982(D)

PCIE SWITCH 982(C)

GPU 984(F)

GPU 984(H)

GPU 984(E)

GPU 984(G)

CPU 980(A)

PCIE SWITCH 982(B)

PCIE SWITCH 982(A)

986

GPU 984(B)

GPU 984(D)

988

GPU 984(A)

GPU 984(C)

994

992

900

NETWORK(S) 990

976

1100

SELECTIVE OPERATING MODE SWITCHING FOR VISIBLE AND INFRARED IMAGING

CROSS-REFERENCE TO RELATED APPLICATIONS

This application is related to U.S. patent application Ser. No. 18/494,010, filed entitled "Infrared Illumination Control for Visible and Infrared Imaging Modes," filed on Oct. 25, 2023.

BACKGROUND

Autonomous and semi-autonomous vehicles and other machines rely on machine learning approaches—such as those using deep neural networks (DNNs)—to analyze images of an interior space (e.g., cabin, cockpit) to perform a number of important purposes. An Occupant Monitoring System (OMS) is an example of a system that may be used within a vehicle cabin to perform real-time assessments of occupant or operator presence, gaze, alertness, and/or other conditions. For example, OMS sensors (such as, but not limited to, RGB sensors, infrared (IR) sensors, depth sensors, cameras, and/or other optical sensors) may be used to track an occupant's or operator's gaze direction, head pose, and/or blinking. This information may be used to determine a level of attentiveness of the occupant or operator (e.g., to detect drowsiness, fatigue, and/or distraction), and/or to take responsive action to prevent harm to the occupant, operator or to the surrounding environment—e.g., by redirecting their attention to a potential hazard, pulling the vehicle over, and/or the like. For example, DNNs may be used to detect that an operator is falling asleep at the wheel, based on the operator's downward gaze toward the floor of the vehicle or prolonged periods without blinking, and the detection may lead to an adjustment in the speed and/or direction of the car (e.g., pulling the vehicle over to the side of the road) or an auditory alert to the operator.

Conventional OMSs have a variety of challenges and drawbacks. For example, some OMSs seek to perform tasks like driver distraction, drowsiness detection, hands-on-wheel detection, three-dimensional (3D) pose estimation, monocular depth estimation, and/or child presence detection with high accuracy under different operating conditions to prevent overly frequent, redundant, or unnecessary alerts to the occupants. However, some operating conditions may lead to depth ambiguities and/or occlusions in sensor data that can limit the accuracy of these tasks. In one example, OMSs often need to perform in the presence of rapid, frequent, and drastic changes in illumination, which may occur in scenarios such as when a vehicle enters or exits a tunnel or parking lot. However, changes in illumination can negatively impact depth perception and detection accuracy, and can even cause failures in detection altogether—for example, when the image is too dark to detect the desired features during operation in visible light spectrums.

OMS systems have begun using RGB/IR cameras that can capture both visible light (in the red, green, and blue or "RGB" spectrums) and IR light. These cameras are equipped with sensors that are sensitive to both types of light, allowing them to record images or videos in both the visible and IR spectrums. Most conventional techniques tend to operate in a single mode, relying on either RGB or IR images for their respective tasks, thereby limiting their ability to operate accurately in the presence of changes in scene illumination. One conventional technique uses an ambient light sensor to detect ambient light and switch between using RGB pixel sensors and IR pixel sensors when the amount of detected ambient light falls below a threshold. However, there are often intermediate and low levels of ambient light where the detection accuracy in RGB and/or IR domains is negatively impacted.

One existing technique attempts to handle changes in scene illumination by switching on an IR emitter to provide IR illumination that boosts signal to noise ratio in the resulting images. However, IR emitters can have several degrading effects on a resulting image. IR light act as contamination for color reproduction and can result in color errors when producing RGB images. Furthermore, IR light can lower the dynamic range of the camera by introducing extra illumination in bright areas. One currently available RGB/IR camera offers an operating mode known as ABAB mode, which switches an IR emitter on and off and alternates between generating "A" frames (IR images) and "B" frames (RGB images). However, this mode generates streams of both IR and RGB image data, one of which is usually not used, effectively wasting the computational resources, power, bandwidth, and memory used to generate that stream.

As such, there is a need for improved sensing and/or detection techniques that generate image data more accurately and/or with sharper detail, and/or that facilitate improved detection accuracy from such image data, in the presence of changes in scene illumination.

SUMMARY

Embodiments of the present disclosure relate to operating modes for visible and infrared imaging. For example, systems and methods are disclosed that toggle between IR and RGB imaging modes (e.g., toggling IR illumination) in response to different thresholds of detected light intensity that depend on the toggling direction. Additionally or alternatively, some embodiments may switch (e.g., based on vehicle speed or gear) between: i) a first operating mode that toggles between IR and RGB imaging modes at a fixed frame rate or interval, and ii) a second operating mode that toggles between IR and RGB imaging modes based on detected light intensity.

In contrast to conventional systems, such as those described above, an image processing pipeline may toggle between IR and RGB imaging modes in response to different thresholds of detected light intensity that depend on the toggling direction (e.g., a lower intensity threshold to switch from RGB to IR imaging and a higher intensity threshold to switch from IR to RGB imaging). For example, the image processing pipeline may switch from RGB to IR imaging in response to detecting an amount of light intensity (e.g., average intensity in a green channel) below a first threshold, and the image processing pipeline may switch from IR to RGB imaging in response to: (i) detecting an amount of light intensity (e.g., average intensity in a green channel) that exceeds a second threshold, and/or (ii) detecting a ratio of detected light intensities (e.g., IR to green) below a third threshold. A gap between the intensity thresholds may be designated to simulate a hysteresis effect that reduces or prevents abrupt changes between IR and RGB imaging modes in response to relatively small changes in detected intensities.

In some embodiments, the image processing pipeline may switch between different operating or switching modes based on speed of ego-motion and/or the active gear (e.g., park vs. drive) of a vehicle or other ego-machine in which the RGB/IR camera is being used. For example, a first operating or switching mode that toggles between IR and RGB imaging modes at a fixed frame rate or interval may be used when the vehicle is in motion, in a particular gear (e.g., drive), and/or traveling above a threshold speed, facilitating a relatively faster switching time and better performance of detection tasks during transitions between imaging modes than other operating or switching modes. For example, a vehicle interior may experience frequent, quick, and/or drastic illumination changes when driving in and out of tunnels or parking garages, and an operating or switching mode such as this may have a relatively shorter switching delay that provides better data coverage during lighting transitions (e.g., because imaging modes do not switch based on lighting changes).

In another example, a second operating or switching mode that toggles between IR and RGB imaging modes based on detected light intensity may be used when the vehicle is in stationary, in park (or out of gear), and/or traveling below a threshold speed. Since an operating or switching mode such as this may effectively generate a single stream of image data, it may operate at a higher frame rate and use a lower bandwidth and less data processing than an operating or switching mode that generates two simultaneous streams, effectively saving resources when frequent or rapid illumination changes are not expected (e.g., since the vehicle is stationary).

As such, the techniques described herein may be utilized to generate RGB and IR images or videos and/or perform one or more detection tasks on such images or videos.

BRIEF DESCRIPTION OF THE DRAWINGS

The present systems and methods for operating modes for visible and infrared imaging are described in detail below with reference to the attached drawing figures, wherein:

FIG. 5 illustrates an example timeline for switching between IR and RGB imaging modes at a fixed frame rate or interval, in accordance with some embodiments of the present disclosure;

FIG. 6 is a flow diagram showing a method for switching between RGB and IR imaging modes based on light intensity, in accordance with some embodiments of the present disclosure;

FIG. 8 is a flow diagram showing a method for switching between operating modes of an image processing pipeline based at least on speed or the active gear of an ego-machine, in accordance with some embodiments of the present disclosure;

DETAILED DESCRIPTION

Figure 1:
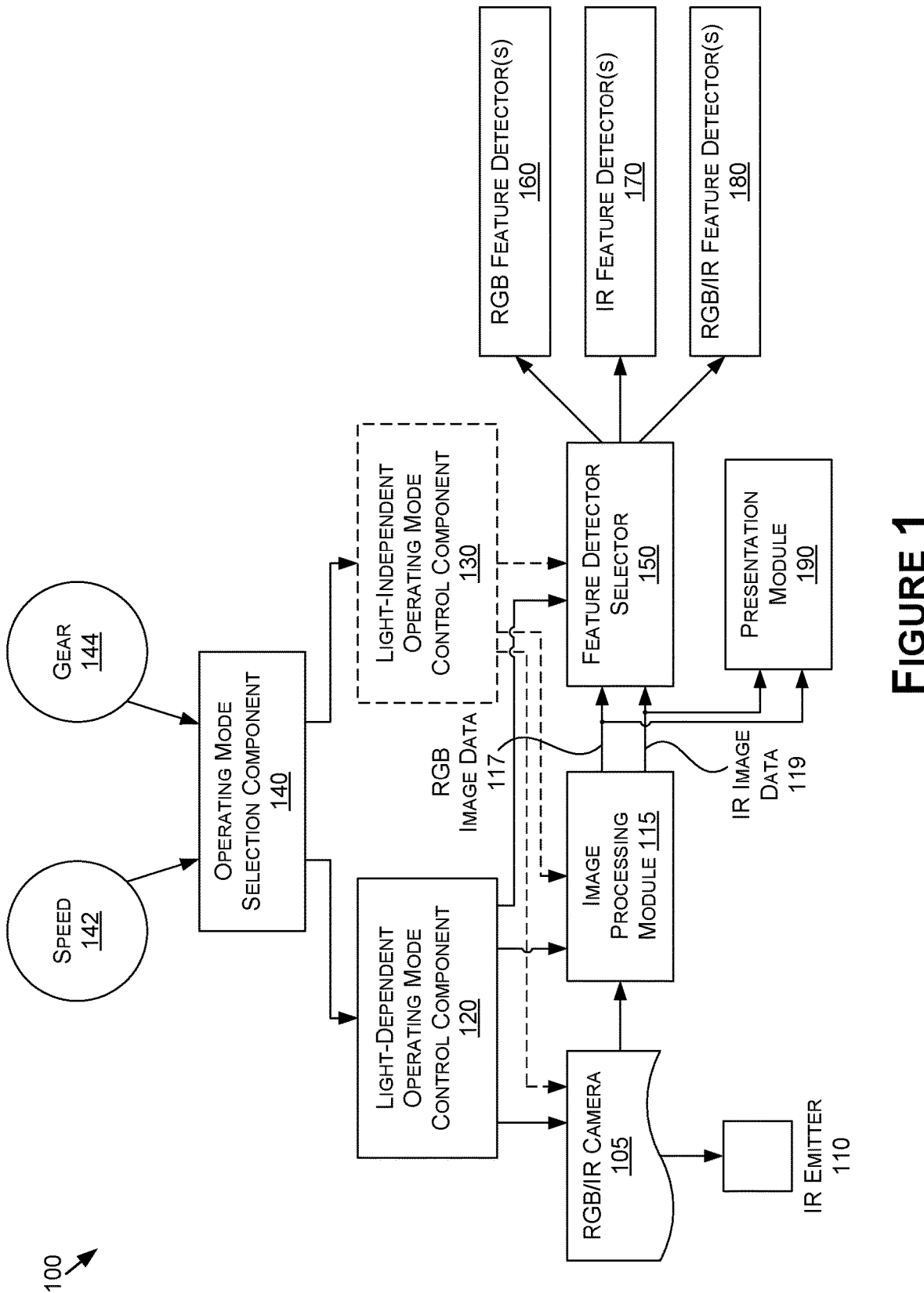
FIG. 1 is a data flow diagram illustrating an example image processing pipeline, in accordance with some embodiments of the present disclosure.

Systems and methods are disclosed related to operating modes for visible and infrared imaging. For example, systems and methods are disclosed that toggle between IR and RGB imaging modes (e.g., toggling IR illumination) in response to different thresholds of detected light intensity that depend on the toggling direction. The gap between intensity thresholds may simulate a hysteresis effect that reduces or prevents abrupt changes between IR and RGB imaging modes in response to relatively small changes in detected intensities. Additionally or alternatively, some embodiments may switch (e.g., based on vehicle speed or gear) between: i) a first operating mode that toggles between IR and RGB imaging modes at a fixed frame rate or interval, and ii) a second operating mode that toggles between IR and RGB imaging modes based on detected light intensity. The present techniques may be utilized to generate images or videos and/or perform one or more detection tasks on such images or videos in monitoring systems (e.g., Occupant or Driver Monitoring Systems), security systems, photography or video systems, scientific or environmental observation systems, and/or other types of systems.

Although the present disclosure may be described with respect to an example autonomous or semi-autonomous vehicle or machine 900 (alternatively referred to herein as "vehicle 900" or "ego-machine 900," an example of which is described with respect to FIGS. 9A-9D), this is not intended to be limiting. For example, the systems and methods described herein may be used by, without limitation, non-autonomous vehicles or machines, semi-autonomous vehicles or machines (e.g., in one or more advanced driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. In addition, although the present disclosure may be described with respect to in-cabin sensing, this is not intended to be limiting, and the systems and methods described herein may be used in augmented reality, virtual reality, mixed reality, robotics, security and surveillance, autonomous or semi-autonomous machine applications, and/or any other technology spaces where visible and/or infrared imaging may be used.

One application for visible and infrared imaging is in an Occupant Monitoring System (OMS), which may be used within a vehicle cabin to perform hands-on-wheel detection, 3D pose estimation, monocular depth estimation, child presence detection, and/or other real-time assessments of occupant and/or operator presence, gaze, alertness, and/or other conditions. OMSs often rely on observations from multiple OMS cameras (e.g., RGB cameras, infrared cameras, combined RGB/infrared (RGB/IR) cameras) positioned at various locations throughout a vehicle interior. Vehicle manufacturers tend to vary the number of OMS cameras from model to model and depending on the trim level. Base models usually have one camera facing the driver (e.g., positioned within a steering column, vehicle pillar, or infotainment console). Higher trim levels may include any number of additional cameras (e.g., one in the steering column facing the driver, one in the rear review mirror facing the driver or the cabin, one in a vehicle pillar facing a particular row of seating, one above a row of headrests facing forward for child detection, etc.). Any or all of these cameras and/or cameras at other locations may be implemented using an RGB/IR camera. OMS cameras are just one possible application for the present techniques, and other applications are contemplated within the scope of the present disclosure.

In some embodiments, an image processing pipeline may adapt to varying lighting conditions by toggling between IR and RGB imaging modes. An operating or switching mode that switches between IR and RGB imaging modes in response to detected light intensity may be referred to as "day-night mode" because it may support transitioning between daytime and nighttime scenarios. For example, an RGB/IR camera, image signal processor (ISP), and/or some other component of an image processing pipeline may adjust one or more settings to optimize image quality and capture corresponding details in response to different lighting conditions. For example, when a measure of detected light intensity meets or exceeds a designated threshold (e.g., during the day), the image processing pipeline may primarily capture and/or process RGB bands to produce color images. As the lighting conditions change and the available visible light decreases, the image processing pipeline may transition to capturing the IR band for better detection and visibility in low-light or nighttime scenarios.

More specifically, an IR emitter (e.g., of an RGB/IR camera) may be toggled and/or one or more camera settings (e.g., exposure time) may be set (e.g., using a control signal applied to an interface of an RGB/IR camera) and/or one or more image processing, rendering, and/or detection techniques may be applied in response to an amount of detected light intensity. For example, an IR imaging or low-light mode (e.g., night mode) may comprise activating an IR emitter, setting a designated exposure time that accommodates the anticipated scene lighting (e.g., low visible light plus IR illumination), generating IR image data (e.g., a greyscale image), determining not to generate or discarding RGB image data, applying the generated IR image data to one or more machine learning models configured to operate on IR image data (e.g., at some designated frame rate), and/or presenting the generated IR image data (e.g., still image(s) and/or a resulting video) on a display (e.g., visible to an operator or occupant of a vehicle in which the RGB/IR camera is being used). An RGB imaging or bright light mode (e.g., day mode) may include operating under conditions with an absence of IR illumination (e.g., turning off an IR emitter), setting a designated exposure time that accommodates the anticipated scene lighting (e.g., visible light), generating RGB image data (e.g., subtracting an amount of detected IR light intensity from an amount of detected light intensity in one or more channels of visible light), determining not to generate or discarding IR image data, applying the generated RGB image data to one or more machine learning models configured to operate on RGB image data (e.g., at some designated frame rate), and/or presenting the generated RGB image data (e.g., still image(s) and/or a resulting video) on a display (e.g., visible to an operator or occupant of a vehicle in which the RGB/IR camera is being used).

In some embodiments, the image processing pipeline may toggle between these IR and RGB imaging modes in response to a detected light intensity meeting or exceeding one or more thresholds, which may include different thresholds of detected light intensity that depend on the toggling direction (e.g., a lower intensity threshold to switch from RGB to IR imaging and a higher intensity threshold to switch from IR to RGB imaging). For example, the image processing pipeline may switch from RGB to IR imaging in response to detecting an amount of light intensity (e.g., average intensity in a green channel) below a first threshold, and the image processing pipeline may switch from IR to RGB imaging in response to: (i) detecting an amount of light intensity (e.g., average intensity in a green channel) that exceeds a second threshold, and/or (ii) detecting a ratio of detected light intensities (e.g., IR to green) below a third threshold. A gap between the intensity thresholds may be designated to simulate a hysteresis effect that reduces or prevents abrupt changes between IR and RGB imaging modes in response to relatively small changes in detected intensities.

Generally, different operating or switching modes may have different benefits in different scenarios and/or for different detection use cases. For example, in some implementations, transitioning between different operating, switching, and/or imaging modes may lead to latency issues, potentially resulting in undesirable or unusable frames during a transition. An operating or switching mode that toggles between IR and RGB imaging modes at a fixed frame rate or interval may be beneficial in ensuring streams of both types of image data are available at a relatively fast frame rate with a relatively faster transition between imaging modes (e.g., by omitting logic that evaluates image data from a previous frame) that reduces or avoids a switching delay that may otherwise result in undesirable or unusable frames. As such, an operating or switching mode such as this may be better equipped to handle frequent, quick, and/or drastic illumination changes, and may facilitate performing detection task(s) at a minimum frame rate, effectively responding faster and extracting better performance during transitions than in other operating or switching modes. Furthermore, by effectively generating simultaneous streams of IR and RGB image data, either or both streams may be used in downstream applications (e.g., detection tasks), for example, by operating on one of the streams based on a given lighting condition or performing feature extraction using frames of image data from both streams simultaneously (e.g., performing a single inference using consecutive frames of RGB and IR image data).

On the other hand an operating or switching mode that toggles between IR and RGB imaging modes based on detected light intensity may be beneficial in optimizing bandwidth, power, and/or compute resources, for example, by reducing the processing load and resource requirements that would otherwise be required to handle simultaneous streams of RGB and IR image data. Furthermore, configuring a single stream of image data may facilitate the use of a higher frame rate for that stream than an image processing pipeline could otherwise handle with simultaneous streams of RGB and IR image data. As such, an operating or switching mode such as this may be equipped to generate a stream of RGB or IR image data at a relatively higher frame rate than in other operating or switching modes, effectively extracting better performance outside of transitions, which may be beneficial for applications such as those that require real-time or high-speed monitoring (e.g., of occupant and/or driver behavior).

In some embodiments, the image processing pipeline may switch between different operating or switching modes based on speed of ego-motion and/or the active gear (e.g., park vs. drive) of the vehicle or other ego-machine in which the RGB/IR camera is being used. For example, a first operating or switching mode that toggles between IR and RGB imaging modes at a fixed frame rate or interval may be used when the vehicle is in one or more states of motion, in a particular gear (e.g., drive), and/or traveling above a threshold speed, facilitating a relatively faster switching time and better performance of detection tasks during transitions between imaging modes than other operating or switching modes. For example, a vehicle interior may experience frequent, quick, and/or drastic illumination changes when driving in and out of tunnels or parking garages, and an operating or switching mode such as this may have a relatively shorter switching delay that provides better data coverage during lighting transitions (e.g., because imaging modes do not switch based on lighting changes). In another example, a second operating or switching mode that toggles between IR and RGB imaging modes based on detected light intensity may be used when the vehicle is in stationary, in park (or out of gear), and/or traveling below a threshold speed. Since an operating or switching mode such as this may effectively generate a single stream of image data, it may operate at a higher frame rate and use a lower bandwidth and less data processing than an operating or switching mode that generates two simultaneous streams, effectively saving resources when frequent or rapid illumination changes are not expected (e.g., since the vehicle is stationary).

As such, the techniques described herein may be utilized to generate RGB and IR images or videos and/or perform one or more detection tasks on such images or videos. Using the techniques described herein, RGB and/or IR images may be generated more accurately and/or with sharper detail than prior techniques, and/or in a way that uses computational resources, memory, and/or bandwidth more efficiently than prior techniques, thereby improving the accuracy and/or bandwidth of downstream applications (e.g., detection tasks) over prior techniques.

With reference to FIG. 1, FIG. 1 illustrates an example image processing pipeline 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionalities to those of example autonomous vehicle 900 of FIGS. 9A-9D, example computing device 1000 of FIG. 10, and/or example data center 1100 of FIG. 11.

In the embodiment illustrated in FIG. 1, the image processing pipeline 100 includes an RGB/IR camera 105, an IR emitter 110, an image processing module 115, a light-dependent operating mode control component 120, a light-independent operating mode control component 130, an operating mode selection component 140, a feature detector selector 150, RGB feature detector(s) 160, IR feature detector(s) 170, RGB/IR feature detector(s) 180, and a presentation module 190. At a high level, the image processing pipeline 100 may operate in an RGB imaging mode in which the RGB/IR camera 105 and the image processing module 115 generate RGB image data 117 and/or an IR imaging mode in which the RGB/IR camera 105 and the image processing module 115 generate IR image data 119. Furthermore, the light-dependent operating mode control component 120 may control a light-dependent operating mode that toggles between the RGB imaging mode and the IR imaging mode based at least on an amount of detected light intensity, and the light-independent operating mode control component 130 may control a light-independent operating mode that toggles between the RGB imaging mode and the IR imaging mode at a fixed frame rate or interval. The operating mode selection component 140 may determine when to operate in the light-dependent and light-independent operating modes (e.g., based on the speed 142 of an ego-machine in which the RGB/IR camera 105 is operating and/or based on which gear 144 is engaged by the ego-machine) and toggle the operating modes accordingly.

The availability of frames and/or streams of RGB image data 117 and IR image data 119 may depend on the operating (or switching) mode, the imaging mode, and/or the embodiment, so the feature detector selector 150 may identify applicable downstream feature detector(s), package the corresponding input data accordingly, and trigger the corresponding feature detection (e.g., at a corresponding frame rate). Additionally or alternatively, depending on the availability of frames and/or streams of RGB image data 117 and IR image data 119, the presentation module 190 may present a representation of the RGB image data 117 and/or the (e.g., colorized, greyscale) IR image data 119, for example, on a display visible to an occupant or operator of the ego-machine. Although FIG. 1 illustrates some components as separate, this need not be the case (e.g., functionality for some illustrated components may be consolidated into a common component).

The RGB/IR camera 105 may be any type of camera(s), optical sensor(s), or other device capable of generating image data in the visible and IR bands. For example, the RGB/IR camera 105 may include or otherwise be associated with one or more (e.g., RGB) pixel sensors that may be used to observe visible (e.g., RGB) light and generate visible image data (e.g., the RGB image data 117) representing the scene and/or object(s) in the field of view of the RGB/IR camera 105. The RGB/IR camera 105 may include or otherwise coordinate with an IR emitter 110 that can illuminate a target region in the field of view of the RGB/IR camera 105. As such, the RGB/IR camera 105 may include or otherwise be associated with one or more IR sensors that may be used to observe or otherwise detect (e.g., an intensity of) IR light (e.g., radiated and/or reflected IR light) and generate IR image data (e.g., the IR image data 119) representing the scene and/or object(s) in the field of view of the RGB/IR camera 105. Visible image data (e.g., an RGB image) typically include pixels that store values that correspond to detected colors. By contrast, IR image data (e.g., an IR image) may include pixels that store values that correspond to detected temperatures, and the IR image data 119 may take the form of a grayscale image or false-color representation in which different shades of grey or different colors are used to represent different temperatures.

The RGB/IR camera 105 may be positioned and/or oriented in various ways depending on the application (e.g., the sensing and/or detection task) and/or the embodiment. For example, taking an application in which the RGB/IR camera 105 is used to generate RGB image data 117 and IR image data 119 (e.g., images and/or video) for monitoring systems, security systems, photography or video systems, scientific or environmental observation systems, and/or other types of systems, the RGB/IR camera 105 may be positioned in a manner that facilitates positioning of some target region (e.g., an area or object being observed or monitored) within the field of view of, and within a suitable distance to, the RGB/IR camera 105. In an example embodiment involving an ego-object such as a vehicle (e.g., the vehicle 900 of FIGS. 9A-9D), the RGB/IR camera 105 may be positioned for interior or exterior sensing (e.g., an OMS or Driver Monitoring System (DMS) camera such as the OMS sensor(s) 901 of the vehicle 900, a surround view camera such as the surround camera(s) 974 of the vehicle 900). Vehicle manufacturers tend to vary the number of OMS cameras from model to model and depending on the trim level, any or all of which, and/or cameras at other locations, may be implemented using the RGB/IR camera 105. These are just a few examples, and other applications, positions, and/or orientations for one or more RGB/IR cameras are contemplated within the scope of the present disclosure.

The RGB/IR camera 105 may include a color filter array (CFA), such as an RGB-IR color filter array. The RGB-IR CFA is a variation of the standard Bayer CFA that substitutes some of the positions in the color filter array that would normally pass red, green, or blue light with an IR filter that passes IR wavelengths (e.g., near-IR wavelengths) and blocks visible light. For example, for each 4×4 area of a Bayer sensor, some implementations replace two of the red and two of the blue filters with IR filters (e.g., an IR cut filter with a narrow band-pass matching the emission spike of the IR emitter 110), creating a repeating pattern across the sensor. Although various embodiments are described as involving certain visible (e.g., RGB) color channels, other combinations of color channels and/or corresponding CFA's are contemplated within the scope of the present disclosure.

The RGB/IR camera 105 may be equipped with the IR emitter 110 and may be configured to synchronize illumination of the IR emitter 110 with capture of image data. Additionally or alternatively, the RGB/IR camera 105 may be equipped with an interface which may be used to control image capture, illumination of the IR emitter 110, and/or one or more camera settings (e.g., exposure time/shutter speed, white balance, ISO setting, aperture, etc.). Although FIG. 1 is illustrated with an embodiment in which the IR emitter 110 is controlled via the RGB/IR camera 105, this need not be the case.

The image processing module 115 may be configured to receive image data from the RGB/IR camera 105 and perform any number and type of known image processing techniques (e.g., gamma correction, exposure compensation, tone mapping, noise reduction, removing bad pixels, applying white balance, demosaicing, color correction, etc.) to generate (e.g., corresponding frames of) the RGB image data 117 and/or the IR image data 119. Generally, image data (e.g., each frame of image data) may represent a set of values from visible light pixel sensors and IR pixel sensors arranged in any suitable manner (e.g., resulting in a corresponding resolution), where the values may include or otherwise represent intensity values (e.g., from red, green, blue, and IR pixel sensors), color information (e.g., from RGB pixel sensors), monochromatic information (e.g., from IR pixel sensors), a computed histogram (e.g., representing counts of pixels having particular values or ranges of values, for each color channel), and/or otherwise. The image processing module 115 may include one or more Image Signal Processors (ISPs), Digital Signal Processors (DSPs), Graphical Processing Units (GPUs), Central Processing Units (CPUs), Data Processing Units (DPUs), Field Programmable Gate Arrays (FPGAs), Application Specific Integrated Circuits (ASICs), some other integrated circuit, or a combination thereof.

Some embodiments may support one or more operating or switching modes that switch or toggle between RGB and IR imaging modes. For example, the light-dependent operating mode control component 120 may implement a light-dependent operating mode (e.g., day-night mode) that dynamically switches between IR and RGB imaging modes in response to detected light intensity (e.g., as described in more detail below), and/or the light-independent operating mode control component 130 may implement a light-independent operating mode that switches between IR and RGB imaging modes at a fixed frame rate or interval. Depending on which operating mode is active (or implemented by a particular embodiment), the light-dependent operating mode control component 120 or the light-independent operating mode control component 130 (or some other component) may communicate with the RGB/IR camera 105, the IR emitter 110, the image processing module 115, the feature detector selector, and/or other components to switch between IR and RGB imaging modes.

In an example implementation involving an IR imaging mode, the light-dependent operating mode control component 120 or the light-independent operating mode control component 130 may control, trigger, instruct, or otherwise facilitate activating and/or operating an IR imaging mode that illuminates the IR emitter 110, sets the RGB/IR camera 105 with a designated exposure time that accommodates the anticipated scene lighting (e.g., low visible light plus IR illumination), triggers the image processing module 115 to generate the IR image data 119 (e.g., a greyscale image, which may include or be based in part on RGB data) and/or to determine not to generate or discard the RGB image data 117, triggers the feature detector selector 150 to apply a representation of the generated IR image data 119 to one or more machine learning models configured to operate on IR image data (e.g., the IR feature detector(s) 170) (e.g., at some designated frame rate), and/or triggers the presentation module 190 to present a representation of the generated IR image data 119 (e.g., still image(s) and/or a resulting video, greyscale and/or colorized) on a display (e.g., visible to an operator or occupant of the ego-machine in which the RGB/IR camera 105 is being used or that is otherwise associated with the RGB/IR camera 105).

In an example implementation involving an RGB mode imaging mode, the light-dependent operating mode control component 120 or the light-independent operating mode control component 130 may control, trigger, instruct, or otherwise facilitate activating and/or operating an RGB imaging mode that turns off the IR emitter 110 (or ensures that it remains off), sets the RGB/IR camera 105 with a designated exposure time that accommodates the anticipated scene lighting (e.g., visible light), triggers the image processing module 115 to generate the RGB image data 117 (e.g., subtracting an amount of detected IR light intensity from an amount of detected light intensity in one or more channels of visible light) and/or to determine not to generate or drop the IR image data 119, triggers the feature detector selector 150 to apply a representation of the generated RGB image data 117 to one or more machine learning models configured to operate on RGB image data (e.g., the RGB feature detector(s) 160) (e.g., at some designated frame rate), and/or triggers the presentation module 190 to present a representation of the generated RGB image data 117 (e.g., still image(s) and/or a resulting video) on a display (e.g., visible to an operator or occupant of the ego-machine in which the RGB/IR camera 105 is being used or that is otherwise associated with the RGB/IR camera 105). These are just a few possible ways in which RGB and/or IR imaging modes may be implemented.

Figure 2:
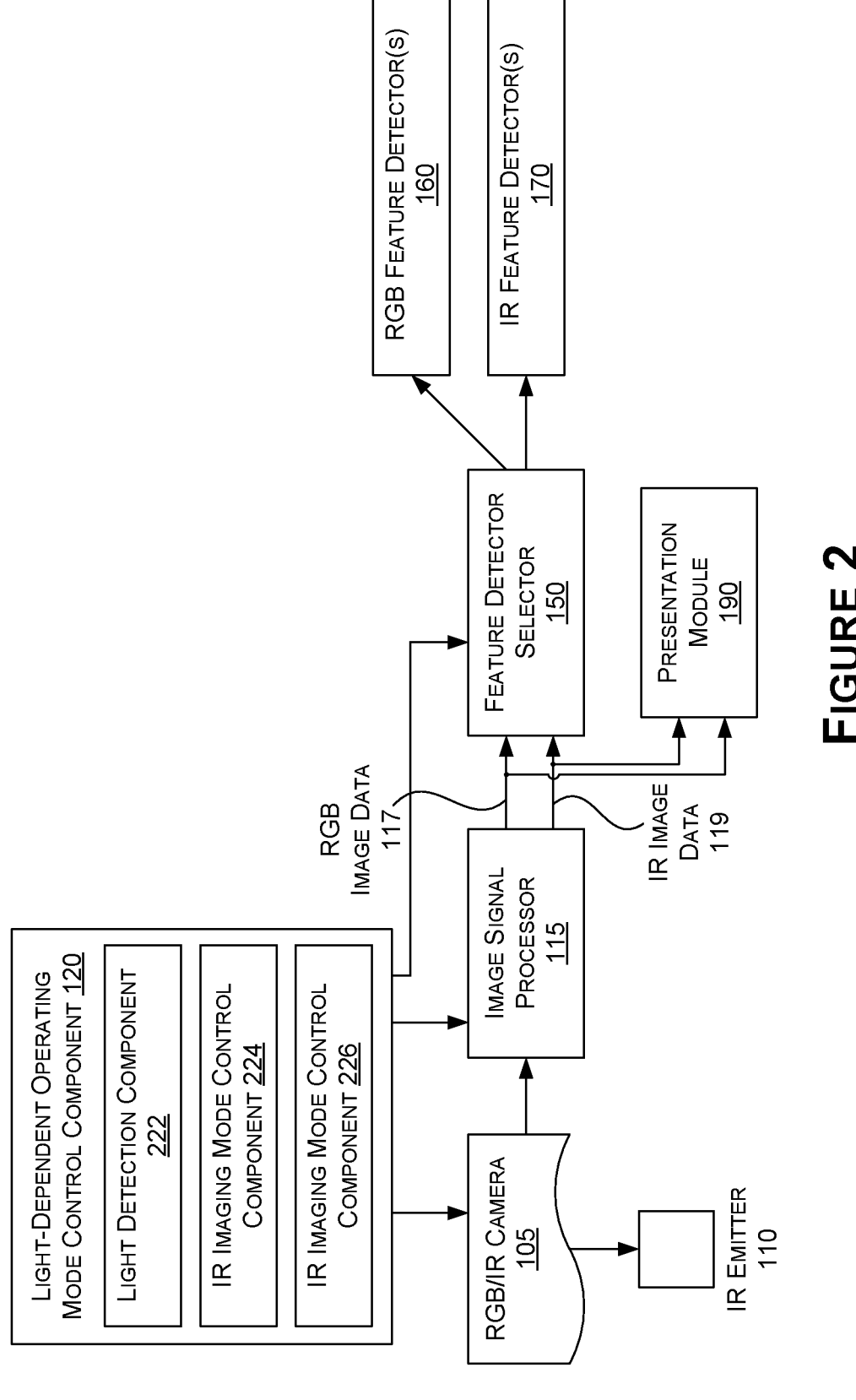
FIG. 2 is a data flow diagram illustrating an example image processing pipeline that supports a light-dependent operating mode, in accordance with some embodiments of the present disclosure.

In some embodiments, a light-dependent operating mode may toggle between RGB imaging mode and the IR imaging mode based on an amount of detected light intensity. FIG. 2 is a data flow diagram illustrating an example image processing pipeline 200 that supports a light-dependent operating mode, in accordance with some embodiments of the present disclosure. The embodiment illustrated in FIG. 2 illustrates a subset of the components of the image processing pipeline 100 of FIG. 1 which may be used to implement an example light-dependent operating mode. In the implementation in FIG. 2, the light-dependent operating mode control component 120 includes a light detection component 222, an IR imaging mode control component 224, and an RGB imaging mode control component 226.

At a high level, the light detection component 222 may determine, compute, or otherwise access a measure of detected light intensity, the IR imaging mode control component 224 may apply logic that determines when to activate and that activates the IR imaging mode, and the RGB imaging mode control component 226 may apply logic that determines when to activate and that activates the RGB imaging mode. For example, the image processing pipeline 200 may operate at a designated frame rate (e.g., 30 frames per second (fps)), the light detection component 222 may analyze each frame of image data generated by the RGB/IR camera 105 and/or the image processing module 115 to determine the measure of detected light intensity in that frame, and the IR imaging mode control component 224 and/or the RGB imaging mode control component 226 may use that measure of detected light intensity to determine whether to apply a corresponding control (e.g., switch to IR or RGB imaging mode) prior to the RGB/IR camera 105 and/or the image processing module 115 generating the subsequent frame.

The light detection component 222 may determine, compute, or otherwise access a measure of detected light intensity in various ways. By way of non-limiting example, each pixel sensor (e.g., per color channel) may output a value (e.g., in digital units) that is proportional to the product of the intensity of light incident on the pixel sensor, the exposure time, and the sensor gain, so the light detection component 222 and/or the image processing module 115 may divide the output of any given pixel sensor by the known exposure time and sensor gain for that pixel sensor to compute a measure of intensity for each pixel. As such, the light detection component 222 may compute an average intensity of one or more pixels in one or more color channels in each frame.

In some embodiments, the light detection component 222 computes average intensity using a histogram of values. For example, the light detection component 222 and/or the image processing module 115 may compute a histogram representing counts of pixels that have particular (e.g., digital unit or intensity) values or ranges of values (e.g., in each of one or more color channels). The light detection component 222 and/or the image processing module 115 may bin the values and count the number of pixels in each bin (e.g., in each channel). Depending on the embodiment, digital unit values may be binned and converted to intensity values, and/or digital unit values may be converted to intensity values and then binned. As such, the light detection component 222 may compute average intensity (e.g., in each of one or more color channels) using a weighted average of the intensity values weighted by the count of pixels for each bin.

In some embodiments, the light detection component 222 may bin, average, and/or otherwise account for only those pixels in a designated region of interest. Taking an example embodiment in which the RGB/IR camera 105 is positioned to view an interior of a cabin with windows, where the monitoring target is (e.g., an operator or occupant) inside the cabin, a portion of the field of view of the RGB/IR camera 105 may not be of interest (e.g., pixels representing the region outside the cabin through the windows). As such, a region of interest may be designated to identify some subset of the pixels in each frame. For example, one or more shapes (e.g., an ellipse, a rectangle, an intersection of multiple shapes, any geometric primitive, etc.) may be positioned in the frame (e.g., centered on a region in which an operator or occupant's face and/or body is expected to be positioned), where the shape(s) and/or positioning may be fixed or dynamic (e.g., a detected mask or bounding box predicted to contain a monitoring target, such as a detected face or detected person). As such, the light detection component 222 may bin, average, and/or otherwise account for only those pixels in a designated region of each frame when determining the measure of detected light intensity.

In some embodiments, the light detection component 222 may discard or ignore (e.g., highlight and/or lowlight) pixels with intensity values that exceed some (e.g., statistical) threshold. For example, the tails of the histogram may represent outliers in intensity values, so the light detection component 222 may discard or ignore some top and/or bottom percentile (e.g., 5 or 10%) of the intensity values from the average, effectively discarding or ignoring the histogram tails, which should reduce the risk of the tails disproportionately impacting the average.

As such, the light detection component 222 may determine, compute, or otherwise access average intensity values (e.g., in a specified region of interest) in each of one or more color channels (e.g., e.g., average intensity values of green G ($G_{avg}$) and IR ($I_{avg}$) channels). Note that some embodiments described herein focus on computing and applying threshold(s) to average intensity in the green channel since the green channel is typically wider than red and blue channels, and may therefore capture more ambient light and may more accurately represent intensity of the ambient light in certain scenarios (e.g., in the presence of red or blue light) than with the use of red or blue channels. However, this need not be the case, and some embodiments may average intensity and apply corresponding thresholds in any desired channel(s) of visible light (e.g., red/blue/green, red/yellow/blue, cyan/yellow/magenta, cyan/yellow/green/magenta, etc.) and/or combination of channels (e.g., a weighted average across multiple channels).

In some embodiments, the IR imaging mode control component 224 determines whether a measure of detected light intensity (e.g., $G_{avg}$) is less than some threshold intensity level, and if so, triggers IR imaging mode (or maintains operation in IR imaging mode if the image processing pipeline 200 was already in IR imaging mode). In some embodiments, the RGB imaging mode control component 226 determines whether a measure of detected light intensity (e.g., $G_{avg}$) is greater than some threshold intensity level and/or determines whether some measure of detected light intensities across multiple color channels (e.g., a ratio such as $I_{avg}/G_{avg}$) is less than (or whether its inverse is greater than) some threshold level. Depending on the embodiment, if either or both are true, the RGB imaging mode control component 226 may trigger RGB imaging mode (or maintains operation in RGB imaging mode if the image processing pipeline 200 was already in RGB imaging mode).

Figure 3:
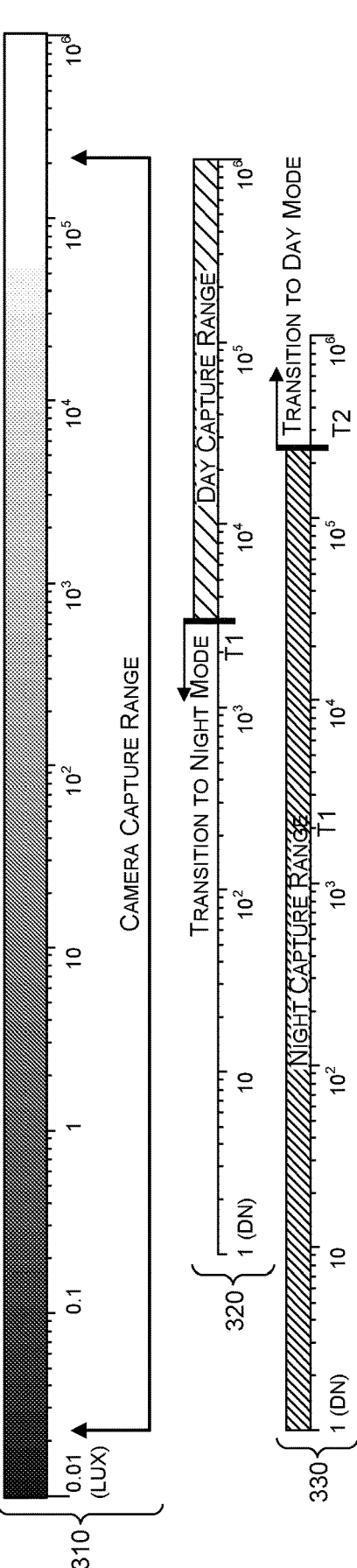
FIG. 3 illustrates example thresholds of detected light intensity for toggling between IR and RGB imaging modes, in accordance with some embodiments of the present disclosure.

In some embodiments, the IR imaging mode control component 224 and the RGB imaging mode control component 226 apply different threshold intensity levels. The gap between intensity thresholds may simulate a hysteresis effect that reduces or prevents abrupt changes between IR and RGB imaging modes in response to relatively small changes in detected intensities. By way of illustration, FIG. 3 illustrates example thresholds of detected light intensity for toggling between IR and RGB imaging modes, in accordance with some embodiments of the present disclosure. In this example, an intensity axis 310 represents a range of intensity values from 0.01 to 106 lumens (LUX), as well as a range of intensity values an example camera may be capable of capturing. Aligned with the intensity axis 310 in lumens are two other intensity axes, an intensity axis 320 representing a first range of intensity values in digital numbers (DNS) that the camera may be capable of capturing in an RGB imaging mode (e.g., when there is at least a threshold amount of ambient light, such as during the day), and an intensity axis 330 representing a second range of intensity values in digital numbers (DNs) that the camera may be capable of capturing in an IR imaging mode (e.g., when there is less than a threshold amount of ambient light, such as at night). The intensity axes 320 and 330 are offset due to a longer exposure time in an example IR imaging mode mapping the same digital number to a lower intensity value in lumens than in an example RGB imaging mode.

The intensity axis 320 illustrates an example threshold intensity level T1 that is lower than the example threshold intensity level T2 on the intensity axis 330. By way of illustration, assume an example image processing pipeline is in an RGB imaging mode. The region on the intensity axis 320 to the right of the threshold intensity level T1 represents a range of detected intensity values (e.g., derived from the green channel) in which the image processing pipeline may continue operating in RGB imaging mode. Once an intensity value is detected to the left of the threshold intensity level T1, the image processing pipeline may switch to IR imaging mode (e.g., night mode). Subsequent detected intensity values may be tested against the threshold intensity level T2 illustrated on the intensity axis 330. The region on the intensity axis 330 to the left of the threshold intensity level T2 represents a range of detected intensity values (e.g., derived from the green channel) in which the image processing pipeline may continue operating in IR imaging mode. Once an intensity value is detected to the right of the threshold intensity level T2 (and/or a ratio of detected light intensities across multiple color channels is less than some other threshold), the image processing pipeline may switch to RGB imaging mode (e.g., day mode).

The thresholds T1 and T2 may be selected in any suitable way. In some embodiments, different thresholds T1 and T2 may be selected to form a gap that simulates a hysteresis effect in the switching between imaging modes. For example, in some embodiments, a threshold T1 is selected below which the signal to noise ratio (SNR) is deemed undesirable (since a detected light intensity below the threshold T1 may trigger the IR imaging mode, which may comprise illuminating an IR emitter). Taking an example embodiment involving in-cabin sensing to detect the presence of a child in a footwell of a vehicle, the threshold T1 may be selected at or near the point at which the resulting image is too dark to detect any objects in the footwell. In some embodiments, the threshold T2 may be selected to be greater than the threshold T1 and to provide a large enough gap to prevent jumps between imaging modes in response to relatively small changes in detected intensities. By way of non-limiting example, the gap between threshold intensity levels may correspond to three f-stops.

Figure 4:
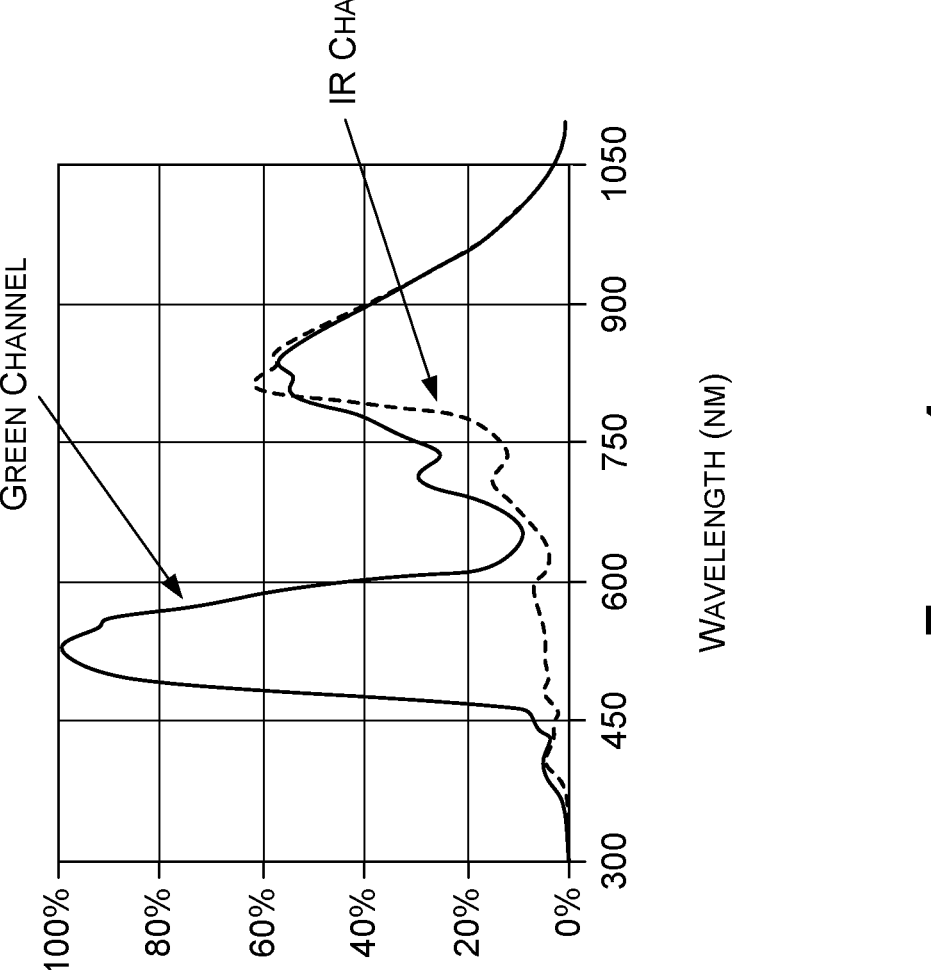
FIG. 4 illustrates example quantum efficiency curves for green and IR bands, in accordance with some embodiments of the present disclosure.

Returning to FIG. 2, in some embodiments, the RGB imaging mode control component 226 checks multiple conditions prior to switching from IR imaging mode to RGB imaging mode. For example, if the IR imaging mode control component 224 determines that a detected light intensity (e.g., $G_{avg}$) is less than some threshold T1, the scene is likely dark, so it may be desirable for the IR imaging mode control component 224 to turn on IR imaging mode (e.g., turn on the IR emitter 110). By contrast, if the RGB imaging mode control component 226 determines that a detected light intensity (e.g., $G_{avg}$) is greater than some threshold T2, the ambient light could still be low, but the detected light intensity could be high due to the illumination resulting from the IR emitter 110. The quantum efficiency of the pixel sensors illustrates why the detected light intensity could be high even when no ambient light is present. FIG. 4 illustrates example quantum efficiency curves for green and IR bands, in accordance with some embodiments of the present disclosure. Note that the quantum efficiency of a sensor (which represents how many photons get converted to electrons in the sensor) of the green channel is almost equal to the quantum efficiency of the IR channel in the IR wavelengths (approximately 780 nanometers to 1 millimeter). In other words, the pixel sensors for the green channel may pick up light from the IR band, so even when it is dark out, the detected light intensity could still be high in the presence of IR illumination. If the IR emitter 110 is turned off in this scenario, the SNR of the resulting image may not be adequate or desirable. As such, additionally (or alternatively) to determining whether a measure of detected light intensity (e.g., $G_{avg}$) is greater than some threshold intensity level, the RGB imaging mode control component 226 may determine whether there is some baseline amount of ambient light, for example, by determining whether a measure of detected light intensities across multiple color channels (e.g., a ratio such as $I_{avg}/G_{avg}$) is less than (or whether its inverse is greater than) some threshold T prior to switching to RGB mode (e.g., and turning of the IR emitter 110).

The threshold T used to determine whether there is a baseline amount of ambient light may be selected in any suitable way. For example, the threshold T may be selected so the IR energy is not dominating the energy in the visible range. Usually, ambient light sources have a very small amount of energy in the IR wavelengths. Due to the quantum efficiency design of most RGB/IR cameras, the ratio of $I_{avg}/G_{avg}$ can be approximated as:

$$I_{avg} / G_{avg} = I_{energy} / (I_{energy} + \text{Visible}_{energy}) \qquad \text{(Eq. 1)}$$

where $I_{energy}$ is a measure of the energy or pixel values in the IR wavelengths, and $\text{Visible}_{energy}$ is a measure of the energy or pixel values in the visible wavelengths. Equation 1 may be solved by requiring $\text{Visible}_{energy}$ to be some designated number X times $I_{energy}$. As such, an example threshold T may be determined based on how many times X greater the $\text{Visible}_{energy}$ or pixels values in RGB imaging mode should be than the $I_{energy}$ or pixels values in IR imaging mode:

$$T = 1 / (1 + X) \qquad \text{(Eq. 2)}$$

These are just a few examples of possible thresholds, and others are contemplated within the scope of the present disclosure. As such, a light-dependent operating mode may be used to toggle between IR and RGB imaging modes in response to a detected light intensity meeting or exceeding one or more thresholds.

Returning to FIG. 1, in some embodiments, the light-independent operating mode control component 130 may implement a light-independent operating mode that toggles between RGB and IR imaging modes at a fixed frame rate or interval. FIG. 5 illustrates an example timeline for switching between IR and RGB imaging modes at a fixed frame rate or interval, in accordance with some embodiments of the present disclosure. This example timeline represents switching at some fixed frame rate (e.g., 30 or 60 fps) or interval such that IR imaging mode (A frames) and RGB imaging mode (B frames) alternate. Taking an example embodiment switching at 60 fps, the IR and RGB frames may each be effectively generated at some lower frame rate (e.g., 30 fps each). As such, the light-independent operating mode may generate streams of both IR image data 119 and RGB image data 117.

In some embodiments, the feature detector selector 150 may select a feature detector corresponding to the imaging mode. For example, the feature detector selector 150 may apply a representation of the IR image data 119 to one or more machine learning models configured to operate on IR image data (e.g., the IR feature detector(s) 170) when the image processing pipeline 100 is in IR imaging mode, and/or the feature detector selector 150 may apply a representation of the RGB image data 117 to one or more machine learning models configured to operate on RGB image data (e.g., the RGB feature detector(s) 160) when the image processing pipeline 100 is in RGB imaging mode. In some embodiments, this may be done independent of whether the image processing pipeline 100 is operating in a light-dependent or light-independent operating mode.

Additionally or alternatively, in some embodiments, such as those that switch between RGB and IR imaging modes at a suitable rate (e.g., when operating a light-independent operating mode at a designated frame rate), the feature detector selector 150 may group and/or otherwise encode frames of the RGB image data 117 and the IR image data 119 representing multiple (e.g., consecutive) time slices (or one more encompassing time slice) together into a corresponding representation and apply it to one or more machine learning models configured to operate on both RGB and IR image data (e.g., the RGB/IR feature detector(s) 180), for example, at some designated frame rate.

Some embodiments may support multiple operating or switching modes that switch or toggle between RGB and IR imaging modes (e.g., light-dependent and light-independent operating modes). Accordingly, the operating mode selection component 140 (or some other component) may select and enable a corresponding operating mode based on any suitable criteria. Taking an example embodiment in which the RGB/IR camera 105 is associated with (e.g., an exterior or interior camera of) an ego-machine (e.g., a vehicle), the operating mode selection component 140 may switch operating modes based on the speed 142 of ego-motion of the ego-machine and/or the gear 144 engaged by the transmission of the ego-machine (e.g., park vs. drive, neutral vs. in gear). For example, the operating mode selection component 140 may accept a representation of the speed 142 of the ego-machine (e.g., a speed signal generated by a speed sensor and/or derived by an inertial measurement unit) and/or a representation of the gear 144 engaged by the transmission of the ego-machine, and the operating mode selection component 140 may select and enable an operating mode based on the speed 142 and/or the gear 144.

In some embodiments, the operating mode selection component 140 may select and enable a light-independent operating mode based on determining that the ego-machine is in motion (e.g., the speed 142 is non-zero), traveling (e.g., the speed 142 is) above a threshold speed, and/or in a particular gear (e.g., drive, in gear), facilitating a relatively faster switching time and better performance of detection tasks during transitions between imaging modes. For example, a vehicle interior may experience frequent, quick, and/or drastic illumination changes when driving in and out of tunnels or parking garages, and an operating or switching mode such as this may have a relatively shorter switching delay that provides better data coverage during lighting transitions (e.g., because imaging modes do not switch based on lighting changes). In some embodiments, the operating mode selection component 140 may select and enable a light-dependent operating mode based on determining that the ego-machine is stationary (e.g., the speed 142 is zero), traveling (e.g., the speed 142 is) below a threshold speed, and/or in park (or out of gear). Since an operating or switching mode such as this may effectively generate a single stream of image data at a time, it may operate at a higher frame rate and use a lower bandwidth and less data processing than an operating or switching mode that generates two simultaneous streams, effectively saving resources when frequent or rapid illumination changes are not expected (e.g., since the vehicle is stationary).

Switching operating modes like this may optimize the performance of downstream feature detector(s). Generally, the RGB feature detector(s) 160, the IR feature detector(s) 170, and/or the RGB/IR feature detector(s) 180 may use any known technique to perform feature detection on corresponding input data. For example, the RGB feature detector(s) 160, the IR feature detector(s) 170, and/or the RGB/IR feature detector(s) 180 may be implemented using one or more deep neural networks (DNNs), such as a convolutional neural network (CNN). Although certain embodiments are described with the RGB feature detector(s) 160, the IR feature detector(s) 170, and/or the RGB/IR feature detector(s) 180 being implemented using neural network(s), this is not intended to be limiting. For example, and without limitation, the RGB feature detector(s) 160, the IR feature detector(s) 170, and/or the RGB/IR feature detector(s) 180 may include any type of a number of different networks or machine learning models, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, transformer, recurrent, perceptrons, Long/Short Term Memory (LSTM), Hopfield, Boltzmann, deep belief, de-convolutional, generative adversarial, liquid state machine, etc.), and/or other types of machine learning models.

When the ego-machine is in motion, traveling above a threshold speed, and/or in a corresponding gear, the ego-machine may travel through frequent and quick illumination changes, like in and out of tunnels, parking lots, and other scenarios. In situations like this, a light-independent operating mode may offer an advantage over a light-dependent operating mode as a result of switching delays due to latency in the light-dependent operating mode, which can cause undesirable or unusable frames during transition phases. By contrast, a light-independent operating mode may capture streams of both RGB and IR image data (e.g., in a synchronized manner), effectively providing both types of data for any given frame or encompassing time slice. As such, both types of data should be available for downstream processing and analysis by the RGB feature detector(s) 160 (e.g., for each from of RGB image data 117), the IR feature detector(s) 170 (e.g., for each frame of IR image data 119), and/or the RGB/IR feature detector(s) 180 (e.g., for paired frames of RGB image data 117 and IR image data 119). Example feature detectors that may be enabled when the ego-machine is in motion include those used for driver distraction detection, driver drowsiness detection, driver hands-on-wheel detection, driver and/or occupant 3D pose estimation (e.g., for size-based age estimation, gesture recognition), monocular depth estimation, and/or others. In the light-independent operating mode, the availability of both types of data provides flexibility in selecting a desired downstream feature detector. For example, the feature detector selector 150 may use the RGB feature detector(s) 160 for each RGB frame and may use the IR feature detector(s) 170 for each IR frame, and/or may choose the RGB feature detector(s) 160 or the IR feature detector(s) 170, for example, based on an amount of detected light intensity (e.g., detected using an ambient light sensor, detected based on a measure of detected light intensity from a previous frame). This flexibility may be advantageous in scenarios where real-time decision-making or immediate access to all data is crucial (e.g., in the case of driver hands-on-wheel detection).

In some embodiments, the RGB/IR feature detector(s) 180 leveraging both IR and RGB frames for inference provides a variety of benefits. For example, IR image data may provide a better representation of depth cues than RGB image data in certain circumstances, which may be beneficial for occupant monitoring features such as hands-on-wheel detection, pose estimation, monocular depth estimation, etc. With respect to hands-on-wheel detection, RGB cues aid in hand appearance and shape and grasp detection, but may not be able to distinguish certain depth ambiguities that are challenging to resolve in RGB color space two-dimensions (e.g., how far behind a driver's hand is from the steering wheel). IR can help resolve these ambiguities, so the combination of RGB and IR can enhance the accuracy and robustness of hands on wheel detection algorithms. With respect to depth estimation, IR image data provides additional depth cues that complement RGB image data, especially in challenging scenarios such as occlusions or low-texture environments. The combination of IR and RGB image data can enhance the accuracy of features like monocular depth estimation, enabling more accurate understanding of the scene's 3D structure. With respect to 3D pose estimation, RGB data provides visual cues for estimating body joint positions, while IR can provide additional depth cues, helping to resolve ambiguities and improve the accuracy of pose estimation in 3D space (e.g., which joint is forward, which is backward, etc.), particularly for challenging poses and/or occlusion scenarios.

Furthermore, in some embodiments, a light-independent operating mode facilitates comprehensive monitoring of both driver and occupants of an ego-machine using a single sensor (i.e., the RGB/IR camera 105). In some embodiments, the RGB image data 117 may be used for occupant monitoring, such as detecting the number of occupants, tracking their movements, and/or analyzing their behavior. In the same time slice, the IR image data 119 from the same RGB/IR camera 105 may be used for driver monitoring, such as monitoring the driver's attention, detecting drowsiness or distraction, and/or tracking facial expressions. As such, a light-independent operating mode may facilitate simultaneous driver monitoring and occupant monitoring using the different types of image data generated by the same RGB/IR camera 105.

When the ego-machine is in stationary, traveling below a threshold speed, and/or in a corresponding gear (or in neutral), frequent or rapid illumination changes are less likely. In situations like this, a light-dependent operating mode may offer various advantages. For example, since a light-dependent operating mode may only capture one stream at a time (either RGB image data 117 or IR image data 119), it facilitates operation at a relatively higher frame rate. For example, a light-independent operating mode may run at 60 fps, but provide individual streams of RGB and IR image data at 30 fps, while a light-dependent operating mode may run at 60 fps, but generate either RGB image data or IR image data at 60 fps. This increased frame rate can be beneficial for applications that require real-time or high-speed monitoring of occupant and driver behavior, enabling more responsive analysis and detection algorithms. Furthermore, the light-dependent operating mode may optimize for bandwidth usage since it only generates one stream, reducing the amount of data that needs to be transmitted, resulting in optimized bandwidth usage. Moreover, the light-dependent operating mode may prioritize RGB image data during well-lit conditions, reducing the processing load and resource requirements for handling both RGB image data and IR image data simultaneously (and vice versa). By focusing on RGB image data alone when appropriate, the light-dependent operating mode can simplify data processing pipelines and improve overall system efficiency. Example feature detectors that may be enabled when the ego-machine is stationary include those used for child presence detection, 3D pose estimation (e.g., for size-based age estimation, gesture recognition), monocular depth estimation, and/or others.

Figure 7:
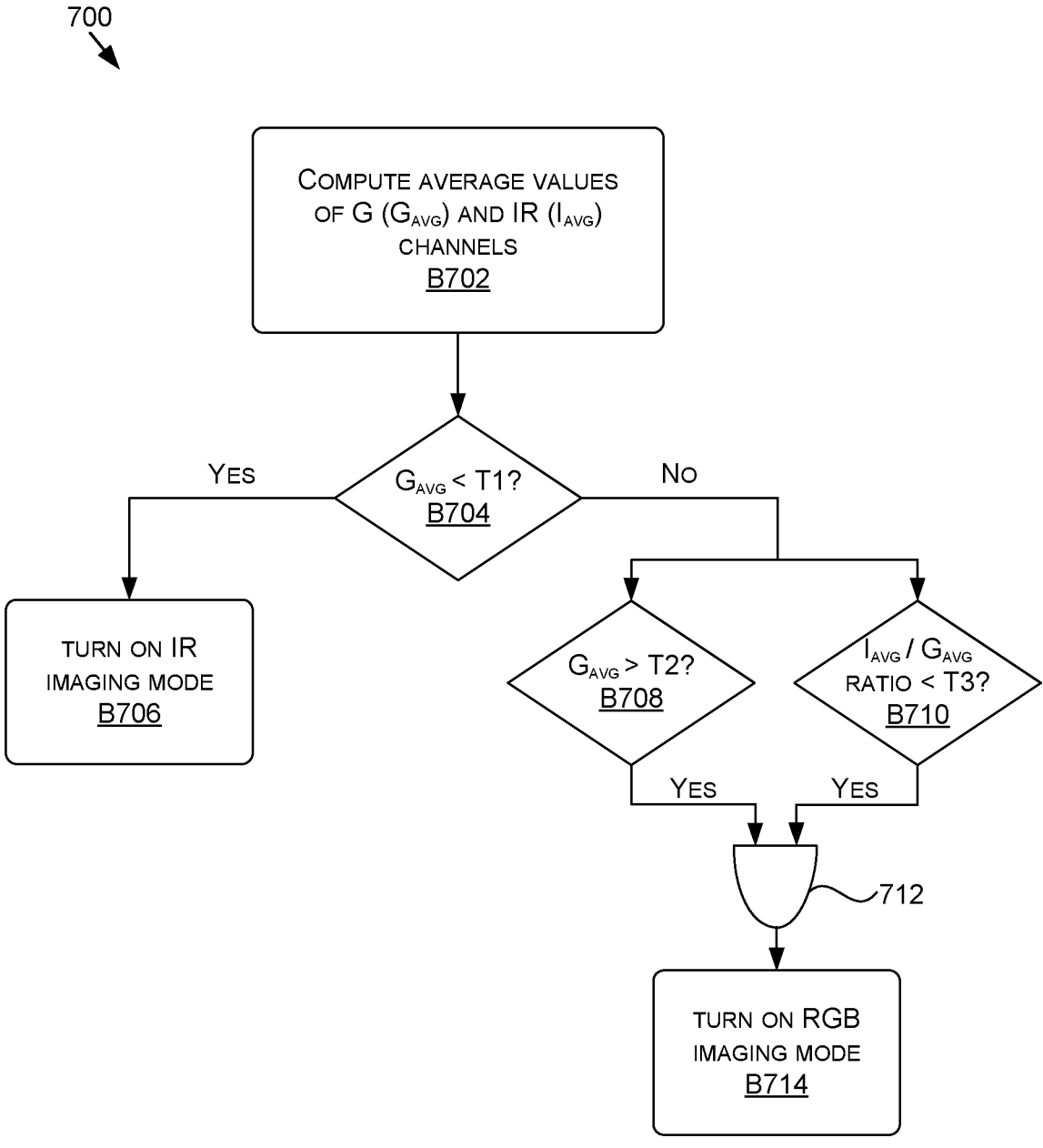
FIG. 7 is a flow diagram showing a method for switching between RGB and IR imaging modes based on different thresholds of detected light intensity, in accordance with some embodiments of the present disclosure.

Now referring to FIGS. 6, 7, and 8, each block of methods 600, 700, and 800 described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, the methods 600, 700, and 800 are described, by way of example, with respect to the image processing pipeline 100 of FIG. 1. However, these methods may additionally or alternatively be executed by any one system, or any combination of systems, including, but not limited to, those described herein.

FIG. 6 is a flow diagram showing a method 600 for switching between RGB and IR imaging modes based on light intensity, in accordance with some embodiments of the present disclosure. The method 600, at block B602, includes generating a first frame of RGB image data based at least on operating an image processing pipeline in an RGB imaging mode. For example, with respect to the imaging processing pipelines 100 and 200 of FIGS. 1 and 2, the light-dependent operating mode control component 120 may control, trigger, instruct, or otherwise facilitate activating and/or operating an RGB imaging mode that turns off the IR emitter 110 (or ensures that it remains off), sets the RGB/IR camera 105 with a designated exposure time that accommodates the anticipated scene lighting (e.g., visible light), triggers the image processing module 115 to generate the RGB image data 117 (e.g., subtracting an amount of detected IR light intensity from an amount of detected light intensity in one or more channels of visible light) and/or to determine not to generate or discard the IR image data 119, triggers the feature detector selector 150 to apply a representation of the generated RGB image data 117 to one or more machine learning models configured to operate on RGB image data (e.g., the RGB feature detector(s) 160) (e.g., at some designated frame rate), and/or triggers the presentation module 190 to present a representation of the generated RGB image data 117 (e.g., still image(s) and/or a resulting video) on a display (e.g., visible to an operator or occupant of the ego-machine in which the RGB/IR camera 105 is being used or that is otherwise associated with the RGB/IR camera 105).

The method 600, at block B604, includes switching, based at least on detecting that a first amount of light intensity associated with the first frame of RGB image data is less than a first intensity threshold, to operating the image processing pipeline in an IR imaging mode to generate a second frame of infrared (IR) image data. For example, with respect to the imaging processing pipeline 200 of FIG. 2, the light detection component 222 may determine, compute, or otherwise access a measure of detected light intensity, and the IR imaging mode control component 224 may determine whether the measure of detected light intensity (e.g., $G_{avg}$) is less than some threshold intensity level, and if so, may trigger an IR imaging mode (or maintain operation in IR imaging mode if the image processing pipeline 200 was already in IR imaging mode). More specifically, with respect to the imaging processing pipelines 100 and 200 of FIGS. 1 and 2, the light-dependent operating mode control component 120 may control, trigger, instruct, or otherwise facilitate activating and/or operating an IR imaging mode that illuminates the IR emitter 110, sets the RGB/IR camera 105 with a designated exposure time that accommodates the anticipated scene lighting (e.g., low visible light plus IR illumination), triggers the image processing module 115 to generate the IR image data 119 (e.g., a greyscale image) and/or to determine not to generate or discard the RGB image data 117, triggers the feature detector selector 150 to apply a representation of the generated IR image data 119 to one or more machine learning models configured to operate on IR image data (e.g., the IR feature detector(s) 170) (e.g., at some designated frame rate), and/or triggers the presentation module 190 to present a representation of the generated IR image data 119 (e.g., still image(s) and/or a resulting video, greyscale and/or colorized) on a display (e.g., visible to an operator or occupant of the ego-machine in which the RGB/IR camera 105 is being used or that is otherwise associated with the RGB/IR camera 105).

The method 600, at block B606, includes switching, based at least on detecting that a second amount of light intensity associated with the second frame of IR image data exceeds a second intensity threshold, to operating the image processing pipeline in the RGB imaging mode. For example, with respect to the imaging processing pipeline 200 of FIG. 2, the RGB imaging mode control component 226 may determine whether a measure of detected light intensity (e.g., $G_{avg}$) is greater than some threshold intensity level and/or determine whether some measure of detected light intensities across multiple color channels (e.g., a ratio such as $I_{avg}/G_{avg}$) is less than (or whether its inverse is greater than) some threshold level. Depending on the embodiment, if either or both are true, the RGB imaging mode control component 226 may trigger RGB imaging mode (or maintains operation in RGB imaging mode if the image processing pipeline 200 was already in RGB imaging mode).

FIG. 7 is a flow diagram showing a method 700 for switching between RGB and IR imaging modes based on different thresholds of detected light intensity, in accordance with some embodiments of the present disclosure. The method 700, at block B702, includes computing average values of detected light intensity in two example channels, green ($G_{avg}$) and IR ($I_{avg}$). For example, with respect to the imaging processing pipeline 200 of FIG. 2, the light detection component 222 may compute an average intensity of one or more pixels in one or more color channels in each frame. The light detection component 222 may compute average intensity (e.g., in each of one or more color channels) using a weighted average of intensity values weighted by the count of pixels for each bin in a corresponding histogram. In some embodiments, the light detection component 222 may bin, average, and/or otherwise account for only those pixels in a designated region of interest, and/or may discard or ignore (e.g., highlight and/or lowlight) pixels with intensity values that exceed some (e.g., statistical) threshold. As such, the light detection component 222 may determine, compute, or otherwise access average intensity values (e.g., in a specified region of interest) in each of one or more color channels (e.g., e.g., average intensity values of green G ($G_{avg}$) and IR ($I_{avg}$) channels).

The method 700, at block B704, includes determining whether $G_{avg}$ is less than a first threshold of detected light intensity. For example, with respect to the image processing pipeline 200 of FIG. 2, the IR imaging mode control component 224 may determine whether the measure of detected light intensity (e.g., $G_{avg}$) is less than some threshold intensity level. If so, the method 700 advances to block B706, which includes turning on an IR imaging mode. For example, with respect to the image processing pipeline 200 of FIG. 2, the IR imaging mode control component 224 may trigger an IR imaging mode (or maintain operation in IR imaging mode if the image processing pipeline 200 was already in IR imaging mode). Otherwise, the method 700 may advance to blocks B708 and B710.

The method 700, at block B708, includes determining whether $G_{avg}$ is greater than a second threshold of detected light intensity. For example, with respect to the image processing pipeline 200 of FIG. 2, the RGB imaging mode control component 226 may determine whether a measure of detected light intensity (e.g., $G_{avg}$) is greater than some threshold intensity level.

The method 700, at block B710, includes determining whether $G_{avg}$ is greater than a second threshold of detected light intensity. For example, with respect to the image processing pipeline 200 of FIG. 2, the RGB imaging mode control component 226 may determine whether some measure of detected light intensities across multiple color channels (e.g., a ratio such as $I_{avg}/G_{avg}$) is less than (or whether its inverse is greater than) some threshold level.

The method 700, at block B712 (illustrated as an AND gate), includes determining whether both conditions determined at blocks B708 and B710 are true. If they are, the method 700 advances to block B714, which includes turning on an RGB imaging mode. For example, with respect to the image processing pipeline 200 of FIG. 2, the RGB imaging mode control component 226 may determine whether a measure of detected light intensity (e.g., $G_{avg}$) is greater than some threshold intensity level and determine whether some measure of detected light intensities across multiple color channels (e.g., a ratio such as $I_{avg}/G_{avg}$) is less than (or whether its inverse is greater than) some threshold level. If both are true, the RGB imaging mode control component 226 may trigger an RGB imaging mode (or maintains operation in RGB imaging mode if the image processing pipeline 200 was already in RGB imaging mode).

FIG. 8 is a flow diagram showing a method 800 for switching between operating modes of an image processing pipeline based at least on speed or the active gear of an ego-machine, in accordance with some embodiments of the present disclosure. The method 800, at block B802, includes operating an image processing pipeline of an ego-machine in a first operating mode that toggles between an RGB imaging mode and an infrared (IR) imaging mode at a fixed rate. For example, with respect to the image processing pipeline 100 of FIG. 1, the light-independent operating mode control component 130 may implement a light-independent operating mode that toggles between RGB and IR imaging modes at a fixed frame rate or interval. FIG. 5 illustrates an example timeline for switching between IR and RGB imaging modes at a fixed frame rate or interval, in accordance with some embodiments of the present disclosure.

The method 800, at block B804, includes switching, based at least on a speed or an active gear of the ego-machine, to operating the image processing pipeline in a second operating mode that toggles between the RGB imaging mode and the IR imaging mode based at least on an amount of detected light intensity. For example, with respect to the image processing pipeline 100 of FIG. 1, the operating mode selection component 140 may switch operating modes based on the speed 142 of ego-motion of an ego-machine associated with the image processing pipeline 100 (e.g., a vehicle in which at least a portion of the image processing pipeline 100 operates) and/or the gear 144 engaged by the transmission of the ego-machine (e.g., park vs. drive, neutral vs. in gear). When the ego-machine is in stationary, traveling below a threshold speed, and/or in a corresponding gear (or in neutral), frequent or rapid illumination changes may be less likely. Accordingly, the operating mode selection component 140 may select and enable a light-dependent operating mode based on determining that the ego-machine is stationary (e.g., the speed 142 is zero), traveling (e.g., the speed 142 is) below a threshold speed, and/or in park (or out of gear).

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing, generative AI, and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems implementing one or more language models-such as one or more large language models (LLMs), systems for performing light transport simulation, systems for performing collaborative content creation for 3D assets, systems implemented at least partially using cloud computing resources, and/or other types of systems.

Example Autonomous Vehicle

Figure 9A:
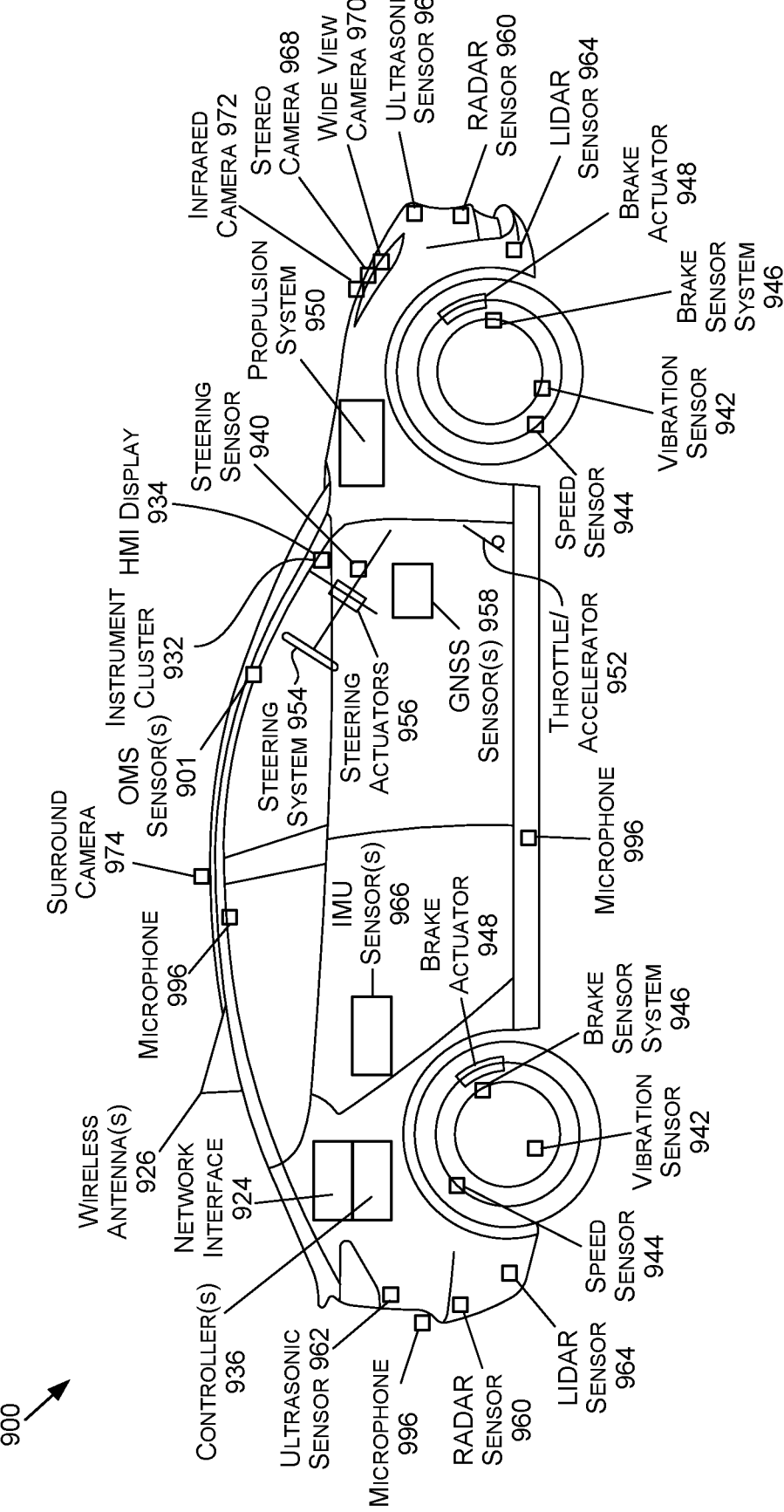
FIG. 9A is an illustration of an example autonomous vehicle, in accordance with some embodiments of the present disclosure.

FIG. 9A is an illustration of an example autonomous vehicle 900, in accordance with some embodiments of the present disclosure. The autonomous vehicle 900 (alternatively referred to herein as the "vehicle 900") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 900 may be capable of functionality in accordance with one or more of Level 3-Level 5 of the autonomous driving levels. The vehicle 900 may be capable of functionality in accordance with one or more of Level 1-Level 5 of the autonomous driving levels. For example, the vehicle 900 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 900 or other machine, such as being fully autonomous, being highly autonomous, being conditionally autonomous, being partially autonomous, providing assistive autonomy, being semi-autonomous, being primarily autonomous, or other designation.

The vehicle 900 may include components such as a chassis, a vehicle body, wheels (e.g., 2, 4, 6, 8, 18, etc.), tires, axles, and other components of a vehicle. The vehicle 900 may include a propulsion system 950, such as an internal combustion engine, hybrid electric power plant, an all-electric engine, and/or another propulsion system type. The propulsion system 950 may be connected to a drive train of the vehicle 900, which may include a transmission, to enable the propulsion of the vehicle 900. The propulsion system 950 may be controlled in response to receiving signals from the throttle/accelerator 952.

A steering system 954, which may include a steering wheel, may be used to steer the vehicle 900 (e.g., along a desired path or route) when the propulsion system 950 is operating (e.g., when the vehicle is in motion). The steering system 954 may receive signals from a steering actuator 956. The steering wheel may be optional for full automation (Level 5) functionality.

The brake sensor system 946 may be used to operate the vehicle brakes in response to receiving signals from the brake actuators 948 and/or brake sensors.

Controller(s) 936, which may include one or more system on chips (SoCs) 904 (FIG. 9C) and/or GPU(s), may provide signals (e.g., representative of commands) to one or more components and/or systems of the vehicle 900. For example, the controller(s) may send signals to operate the vehicle brakes via one or more brake actuators 948, to operate the steering system 954 via one or more steering actuators 956, to operate the propulsion system 950 via one or more throttle/accelerators 952. The controller(s) 936 may include one or more onboard (e.g., integrated) computing devices (e.g., supercomputers) that process sensor signals, and output operation commands (e.g., signals representing commands) to enable autonomous driving and/or to assist a human driver in driving the vehicle 900. The controller(s) 936 may include a first controller 936 for autonomous driving functions, a second controller 936 for functional safety functions, a third controller 936 for artificial intelligence functionality (e.g., computer vision), a fourth controller 936 for infotainment functionality, a fifth controller 936 for redundancy in emergency conditions, and/or other controllers. In some examples, a single controller 936 may handle two or more of the above functionalities, two or more controllers 936 may handle a single functionality, and/or any combination thereof.

The controller(s) 936 may provide the signals for controlling one or more components and/or systems of the vehicle 900 in response to sensor data received from one or more sensors (e.g., sensor inputs). The sensor data may be received from, for example and without limitation, global navigation satellite systems ("GNSS") sensor(s) 958 (e.g., Global Positioning System sensor(s)), RADAR sensor(s) 960, ultrasonic sensor(s) 962, LIDAR sensor(s) 964, inertial measurement unit (IMU) sensor(s) 966 (e.g., accelerometer(s), gyroscope(s), magnetic compass(es), magnetometer(s), etc.), microphone(s) 996, stereo camera(s) 968, wide-view camera(s) 970 (e.g., fisheye cameras), infrared camera(s) 972, surround camera(s) 974 (e.g., 360 degree cameras), long-range and/or mid-range camera(s) 998, speed sensor(s) 944 (e.g., for measuring the speed of the vehicle 900), vibration sensor(s) 942, steering sensor(s) 940, brake sensor(s) (e.g., as part of the brake sensor system 946), one or more occupant monitoring system (OMS) sensor(s) 901 (e.g., one or more interior cameras), and/or other sensor types.

One or more of the controller(s) 936 may receive inputs (e.g., represented by input data) from an instrument cluster 932 of the vehicle 900 and provide outputs (e.g., represented by output data, display data, etc.) via a human-machine interface (HMI) display 934, an audible annunciator, a loudspeaker, and/or via other components of the vehicle 900. The outputs may include information such as vehicle velocity, speed, time, map data (e.g., the High Definition ("HD") map 922 of FIG. 9C), location data (e.g., the vehicle's 900 location, such as on a map), direction, location of other vehicles (e.g., an occupancy grid), information about objects and status of objects as perceived by the controller(s) 936, etc. For example, the HMI display 934 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 900 further includes a network interface 924 which may use one or more wireless antenna(s) 926 and/or modem(s) to communicate over one or more networks. For example, the network interface 924 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 926 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 9B:
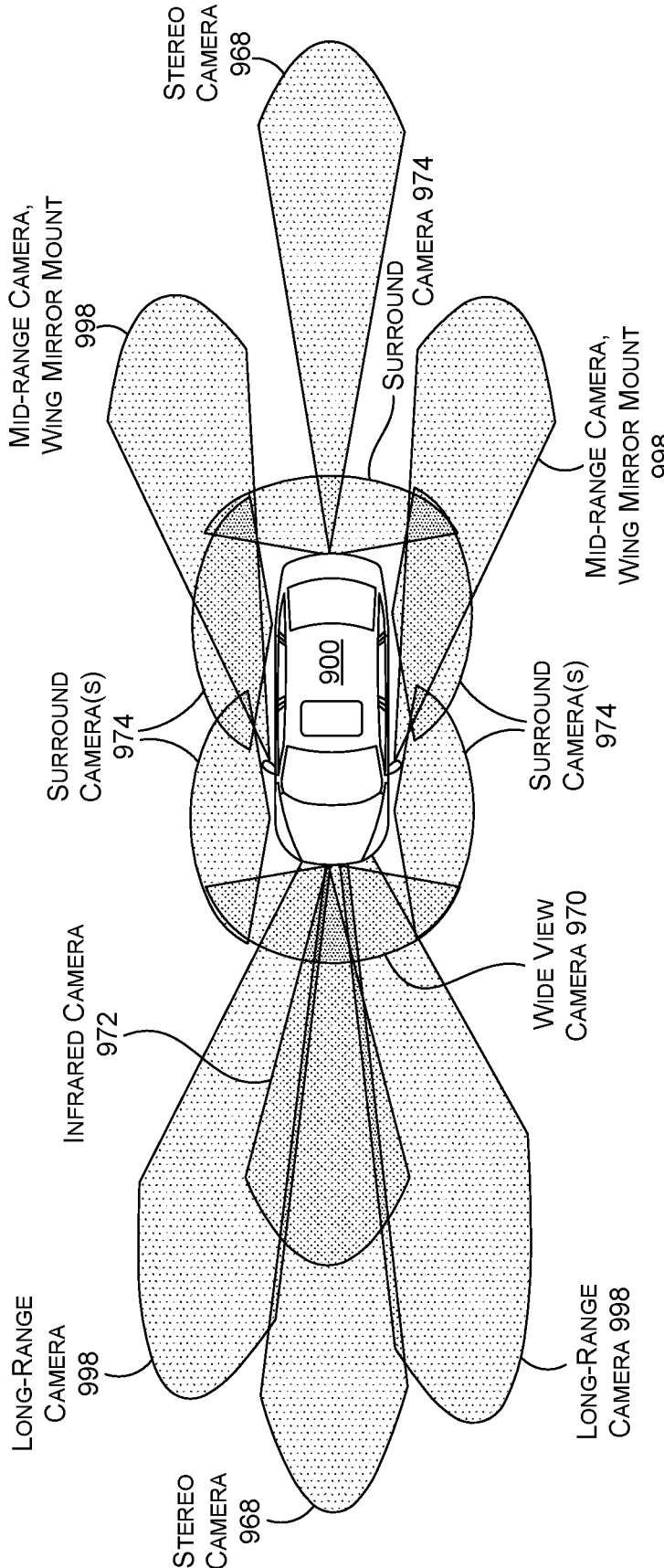
FIG. 9B is an example of camera locations and fields of view for the example autonomous vehicle of FIG. 9A, in accordance with some embodiments of the present disclosure.

FIG. 9B is an example of camera locations and fields of view for the example autonomous vehicle 900 of FIG. 9A, in accordance with some embodiments of the present disclosure. The cameras and respective fields of view are one example embodiment and are not intended to be limiting. For example, additional and/or alternative cameras may be included and/or the cameras may be located at different locations on the vehicle 900.

The camera types for the cameras may include, but are not limited to, digital cameras that may be adapted for use with the components and/or systems of the vehicle 900. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 900 (e.g., front-facing cameras) may be used for surround view, to help identify forward facing paths and obstacles, as well aid in, with the help of one or more controllers 936 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 970 that may be used to perceive objects coming into view from the periphery (e.g., pedestrians, crossing traffic or bicycles). Although only one wide-view camera is illustrated in FIG. 9B, there may be any number (including zero) of wide-view cameras 970 on the vehicle 900. In addition, any number of long-range camera(s) 998 (e.g., a long-view stereo camera pair) may be used for depth-based object detection, especially for objects for which a neural network has not yet been trained. The long-range camera(s) 998 may also be used for object detection and classification, as well as basic object tracking.

Any number of stereo cameras 968 may also be included in a front-facing configuration. In at least one embodiment, one or more of stereo camera(s) 968 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 968 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 968 may be used in addition to, or alternatively from, those described herein.

Cameras with a field of view that include portions of the environment to the side of the vehicle 900 (e.g., side-view cameras) may be used for surround view, providing information used to create and update the occupancy grid, as well as to generate side impact collision warnings. For example, surround camera(s) 974 (e.g., four surround cameras 974 as illustrated in FIG. 9B) may be positioned to on the vehicle 900. The surround camera(s) 974 may include wide-view camera(s) 970, fisheye camera(s), 360 degree camera(s), and/or the like. Four example, four fisheye cameras may be positioned on the vehicle's front, rear, and sides. In an alternative arrangement, the vehicle may use three surround camera(s) 974 (e.g., left, right, and rear), and may leverage one or more other camera(s) (e.g., a forward-facing camera) as a fourth surround view camera.

Cameras with a field of view that include portions of the environment to the rear of the vehicle 900 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 998, stereo camera(s) 968), infrared camera(s) 972, etc.), as described herein.

Cameras with a field of view that include portions of the interior environment within the cabin of the vehicle 900 (e.g., one or more OMS sensor(s) 901) may be used as part of an occupant monitoring system (OMS) such as, but not limited to, a driver monitoring system (DMS). For example, OMS sensors (e.g., the OMS sensor(s) 901) may be used (e.g., by the controller(s) 936) to track an occupant's and/or driver's gaze direction, head pose, and/or blinking. This gaze information may be used to determine a level of attentiveness of the occupant or driver (e.g., to detect drowsiness, fatigue, and/or distraction), and/or to take responsive action to prevent harm to the occupant or operator. In some embodiments, data from OMS sensors may be used to enable gaze-controlled operations triggered by driver and/or non-driver occupants such as, but not limited to, adjusting cabin temperature and/or airflow, opening and closing windows, controlling cabin lighting, controlling entertainment systems, adjusting mirrors, adjusting seat positions, and/or other operations. In some embodiments, an OMS may be used for applications such as determining when objects and/or occupants have been left behind in a vehicle cabin (e.g., by detecting occupant presence after the driver exits the vehicle).

Figure 9C:
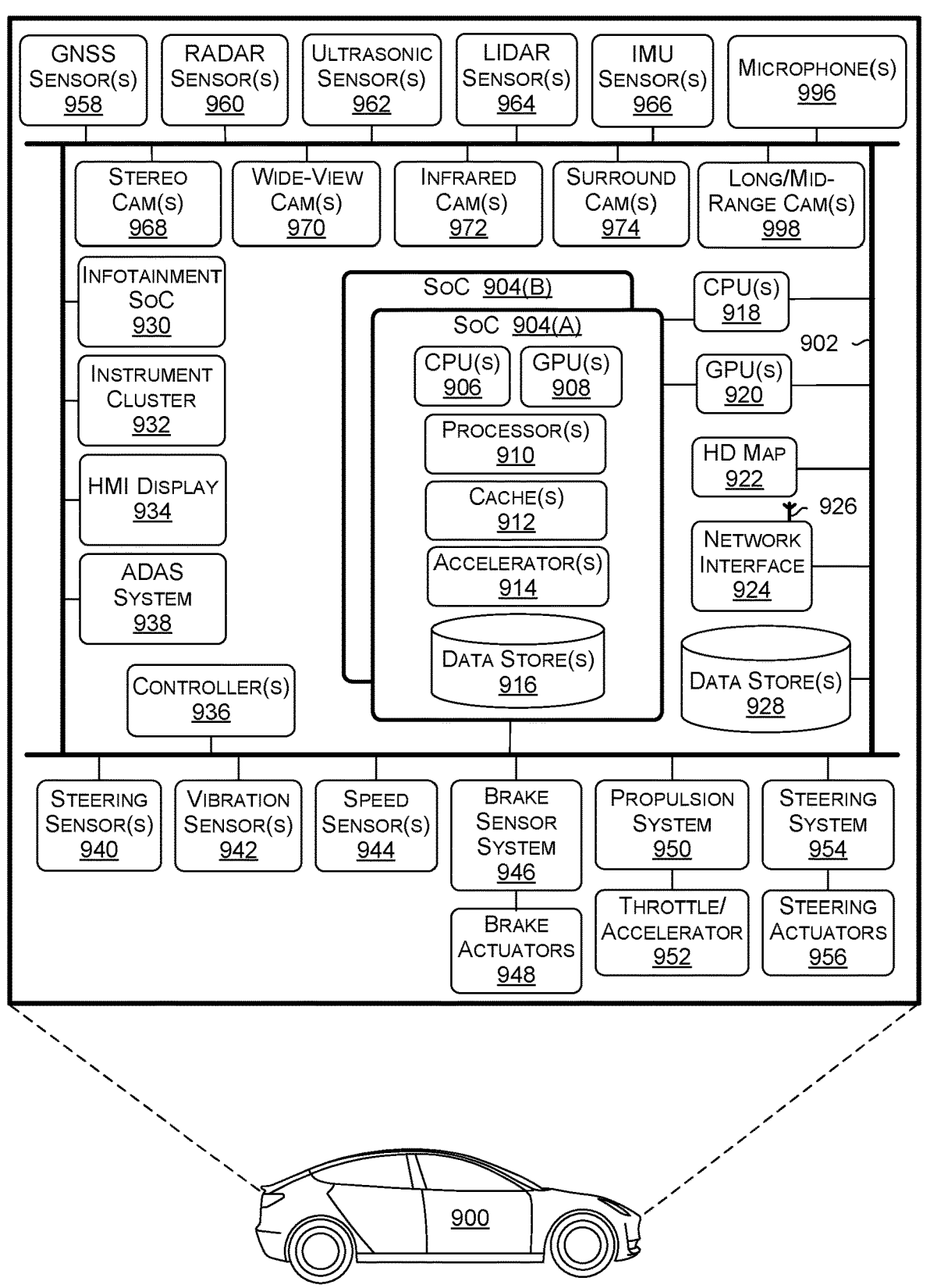
FIG. 9C is a block diagram of an example system architecture for the example autonomous vehicle of FIG. 9A, in accordance with some embodiments of the present disclosure.

FIG. 9C is a block diagram of an example system architecture for the example autonomous vehicle 900 of FIG. 9A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 900 in FIG. 9C are illustrated as being connected via bus 902. The bus 902 may include a Controller Area Network (CAN) data interface (alternatively referred to herein as a "CAN bus"). A CAN may be a network inside the vehicle 900 used to aid in control of various features and functionality of the vehicle 900, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 902 is described herein as being a CAN bus, this is not intended to be limiting. For example, in addition to, or alternatively from, the CAN bus, FlexRay and/or Ethernet may be used. Additionally, although a single line is used to represent the bus 902, this is not intended to be limiting. For example, there may be any number of busses 902, which may include one or more CAN busses, one or more FlexRay busses, one or more Ethernet busses, and/or one or more other types of busses using a different protocol. In some examples, two or more busses 902 may be used to perform different functions, and/or may be used for redundancy. For example, a first bus 902 may be used for collision avoidance functionality and a second bus 902 may be used for actuation control. In any example, each bus 902 may communicate with any of the components of the vehicle 900, and two or more busses 902 may communicate with the same components. In some examples, each SoC 904, each controller 936, and/or each computer within the vehicle may have access to the same input data (e.g., inputs from sensors of the vehicle 900), and may be connected to a common bus, such the CAN bus.

The vehicle 900 may include one or more controller(s) 936, such as those described herein with respect to FIG. 9A. The controller(s) 936 may be used for a variety of functions. The controller(s) 936 may be coupled to any of the various other components and systems of the vehicle 900, and may be used for control of the vehicle 900, artificial intelligence of the vehicle 900, infotainment for the vehicle 900, and/or the like.

The vehicle 900 may include a system(s) on a chip (SoC) 904. The SoC 904 may include CPU(s) 906, GPU(s) 908, processor(s) 910, cache(s) 912, accelerator(s) 914, data store(s) 916, and/or other components and features not illustrated. The SoC(s) 904 may be used to control the vehicle 900 in a variety of platforms and systems. For example, the SoC(s) 904 may be combined in a system (e.g., the system of the vehicle 900) with an HD map 922 which may obtain map refreshes and/or updates via a network interface 924 from one or more servers (e.g., server(s) 978 of FIG. 9D).

The CPU(s) 906 may include a CPU cluster or CPU complex (alternatively referred to herein as a "CCPLEX"). The CPU(s) 906 may include multiple cores and/or L2 caches. For example, in some embodiments, the CPU(s) 906 may include eight cores in a coherent multi-processor configuration. In some embodiments, the CPU(s) 906 may include four dual-core clusters where each cluster has a dedicated L2 cache (e.g., a 2 MB L2 cache). The CPU(s) 906 (e.g., the CCPLEX) may be configured to support simultaneous cluster operation enabling any combination of the clusters of the CPU(s) 906 to be active at any given time.

The CPU(s) 906 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 906 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 908 may include an integrated GPU (alternatively referred to herein as an "iGPU"). The GPU(s) 908 may be programmable and may be efficient for parallel workloads. The GPU(s) 908, in some examples, may use an enhanced tensor instruction set. The GPU(s) 908 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 908 may include at least eight streaming microprocessors. The GPU(s) 908 may use compute application programming interface(s) (API(s)). In addition, the GPU(s) 908 may use one or more parallel computing platforms and/or programming models (e.g., NVIDIA's CUDA).

The GPU(s) 908 may be power-optimized for best performance in automotive and embedded use cases. For example, the GPU(s) 908 may be fabricated on a Fin field-effect transistor (FinFET). However, this is not intended to be limiting and the GPU(s) 908 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 908 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 908 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 908 to access the CPU(s) 906 page tables directly. In such examples, when the GPU(s) 908 memory management unit (MMU) experiences a miss, an address translation request may be transmitted to the CPU(s) 906. In response, the CPU(s) 906 may look in its page tables for the virtual-to-physical mapping for the address and transmits the translation back to the GPU(s) 908. As such, unified memory technology may allow a single unified virtual address space for memory of both the CPU(s) 906 and the GPU(s) 908, thereby simplifying the GPU(s) 908 programming and porting of applications to the GPU(s) 908.

In addition, the GPU(s) 908 may include an access counter that may keep track of the frequency of access of the GPU(s) 908 to memory of other processors. The access counter may help ensure that memory pages are moved to the physical memory of the processor that is accessing the pages most frequently.

The SoC(s) 904 may include any number of cache(s) 912, including those described herein. For example, the cache(s) 912 may include an L3 cache that is available to both the CPU(s) 906 and the GPU(s) 908 (e.g., that is connected both the CPU(s) 906 and the GPU(s) 908). The cache(s) 912 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 904 may include an arithmetic logic unit(s) (ALU(s)) which may be leveraged in performing processing with respect to any of the variety of tasks or operations of the vehicle 900—such as processing DNNs. In addition, the SoC(s) 904 may include a floating point unit(s) (FPU(s))—or other math coprocessor or numeric coprocessor types—for performing mathematical operations within the system. For example, the SoC(s) 904 may include one or more FPUs integrated as execution units within a CPU(s) 906 and/or GPU(s) 908.

The SoC(s) 904 may include one or more accelerators 914 (e.g., hardware accelerators, software accelerators, or a combination thereof). For example, the SoC(s) 904 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 908 and to off-load some of the tasks of the GPU(s) 908 (e.g., to free up more cycles of the GPU(s) 908 for performing other tasks). As an example, the accelerator(s) 914 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 914 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 908, and by using an inference accelerator, for example, a designer may target either the DLA(s) or the GPU(s) 908 for any function. For example, the designer may focus processing of CNNs and floating point operations on the DLA(s) and leave other functions to the GPU(s) 908 and/or other accelerator(s) 914.

The accelerator(s) 914 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 906. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 914 (e.g., the hardware acceleration cluster) may include a computer vision network on-chip and SRAM, for providing a high-bandwidth, low latency SRAM for the accelerator(s) 914. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 904 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 914 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 966 output that correlates with the vehicle 900 orientation, distance, 3D location estimates of the object obtained from the neural network and/or other sensors (e.g., LIDAR sensor(s) 964 or RADAR sensor(s) 960), among others.

The SoC(s) 904 may include data store(s) 916 (e.g., memory). The data store(s) 916 may be on-chip memory of the SoC(s) 904, which may store neural networks to be executed on the GPU and/or the DLA. In some examples, the data store(s) 916 may be large enough in capacity to store multiple instances of neural networks for redundancy and safety. The data store(s) 916 may comprise L2 or L3 cache(s) 912. Reference to the data store(s) 916 may include reference to the memory associated with the PVA, DLA, and/or other accelerator(s) 914, as described herein.

The SoC(s) 904 may include one or more processor(s) 910 (e.g., embedded processors). The processor(s) 910 may include a boot and power management processor that may be a dedicated processor and subsystem to handle boot power and management functions and related security enforcement. The boot and power management processor may be a part of the SoC(s) 904 boot sequence and may provide runtime power management services. The boot power and management processor may provide clock and voltage programming, assistance in system low power state transitions, management of SoC(s) 904 thermals and temperature sensors, and/or management of the SoC(s) 904 power states. Each temperature sensor may be implemented as a ring-oscillator whose output frequency is proportional to temperature, and the SoC(s) 904 may use the ring-oscillators to detect temperatures of the CPU(s) 906, GPU(s) 908, and/or accelerator(s) 914. If temperatures are determined to exceed a threshold, the boot and power management processor may enter a temperature fault routine and put the SoC(s) 904 into a lower power state and/or put the vehicle 900 into a chauffeur to safe stop mode (e.g., bring the vehicle 900 to a safe stop).

The processor(s) 910 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 910 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 910 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 910 may further include a real-time camera engine that may include a dedicated processor subsystem for handling real-time camera management.

The processor(s) 910 may further include a high-dynamic range signal processor that may include an image signal processor that is a hardware engine that is part of the camera processing pipeline.

The processor(s) 910 may include a video image compositor that may be a processing block (e.g., implemented on a microprocessor) that implements video post-processing functions needed by a video playback application to produce the final image for the player window. The video image compositor may perform lens distortion correction on wideview camera(s) 970, surround camera(s) 974, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 908 is not required to continuously render new surfaces. Even when the GPU(s) 908 is powered on and active doing 3D rendering, the video image compositor may be used to offload the GPU(s) 908 to improve performance and responsiveness.

The SoC(s) 904 may further include a mobile industry processor interface (MIPI) camera serial interface for receiving video and input from cameras, a high-speed interface, and/or a video input block that may be used for camera and related pixel input functions. The SoC(s) 904 may further include an input/output controller(s) that may be controlled by software and may be used for receiving I/O signals that are uncommitted to a specific role.

The SoC(s) 904 may further include a broad range of peripheral interfaces to enable communication with peripherals, audio codecs, power management, and/or other devices. The SoC(s) 904 may be used to process data from cameras (e.g., connected over Gigabit Multimedia Serial Link and Ethernet), sensors (e.g., LIDAR sensor(s) 964, RADAR sensor(s) 960, etc. that may be connected over Ethernet), data from bus 902 (e.g., speed of vehicle 900, steering wheel position, etc.), data from GNSS sensor(s) 958 (e.g., connected over Ethernet or CAN bus). The SoC(s) 904 may further include dedicated high-performance mass storage controllers that may include their own DMA engines, and that may be used to free the CPU(s) 906 from routine data management tasks.

The SoC(s) 904 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 904 may be faster, more reliable, and even more energy-efficient and space-efficient than conventional systems. For example, the accelerator(s) 914, when combined with the CPU(s) 906, the GPU(s) 908, and the data store(s) 916, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 920) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 908.

In some examples, a CNN for facial recognition and vehicle owner identification may use data from camera sensors to identify the presence of an authorized driver and/or owner of the vehicle 900. The always on sensor processing engine may be used to unlock the vehicle when the owner approaches the driver door and turn on the lights, and, in security mode, to disable the vehicle when the owner leaves the vehicle. In this way, the SoC(s) 904 provide for security against theft and/or carjacking.

In another example, a CNN for emergency vehicle detection and identification may use data from microphones 996 to detect and identify emergency vehicle sirens. In contrast to conventional systems, that use general classifiers to detect sirens and manually extract features, the SoC(s) 904 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 958. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 962, until the emergency vehicle(s) passes.

The vehicle may include a CPU(s) 918 (e.g., discrete CPU(s), or dCPU(s)), that may be coupled to the SoC(s) 904 via a high-speed interconnect (e.g., PCIe). The CPU(s) 918 may include an X86 processor, for example. The CPU(s) 918 may be used to perform any of a variety of functions, including arbitrating potentially inconsistent results between ADAS sensors and the SoC(s) 904, and/or monitoring the status and health of the controller(s) 936 and/or infotainment SoC 930, for example.

The vehicle 900 may include a GPU(s) 920 (e.g., discrete GPU(s), or dGPU(s)), that may be coupled to the SoC(s) 904 via a high-speed interconnect (e.g., NVIDIA's NVLINK). The GPU(s) 920 may provide additional artificial intelligence functionality, such as by executing redundant and/or different neural networks, and may be used to train and/or update neural networks based on input (e.g., sensor data) from sensors of the vehicle 900.

The vehicle 900 may further include the network interface 924 which may include one or more wireless antennas 926 (e.g., one or more wireless antennas for different communication protocols, such as a cellular antenna, a Bluetooth antenna, etc.). The network interface 924 may be used to enable wireless connectivity over the Internet with the cloud (e.g., with the server(s) 978 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 900 information about vehicles in proximity to the vehicle 900 (e.g., vehicles in front of, on the side of, and/or behind the vehicle 900). This functionality may be part of a cooperative adaptive cruise control functionality of the vehicle 900.

The network interface 924 may include a SoC that provides modulation and demodulation functionality and enables the controller(s) 936 to communicate over wireless networks. The network interface 924 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 900 may further include data store(s) 928 which may include off-chip (e.g., off the SoC(s) 904) storage. The data store(s) 928 may include one or more storage elements including RAM, SRAM, DRAM, VRAM, Flash, hard disks, and/or other components and/or devices that may store at least one bit of data.

The vehicle 900 may further include GNSS sensor(s) 958. The GNSS sensor(s) 958 (e.g., GPS, assisted GPS sensors, differential GPS (DGPS) sensors, etc.), to assist in mapping, perception, occupancy grid generation, and/or path planning functions. Any number of GNSS sensor(s) 958 may be used, including, for example and without limitation, a GPS using a USB connector with an Ethernet to Serial (RS-232) bridge.

The vehicle 900 may further include RADAR sensor(s) 960. The RADAR sensor(s) 960 may be used by the vehicle 900 for long-range vehicle detection, even in darkness and/or severe weather conditions. RADAR functional safety levels may be ASIL B. The RADAR sensor(s) 960 may use the CAN and/or the bus 902 (e.g., to transmit data generated by the RADAR sensor(s) 960) for control and to access object tracking data, with access to Ethernet to access raw data in some examples. A wide variety of RADAR sensor types may be used. For example, and without limitation, the RADAR sensor(s) 960 may be suitable for front, rear, and side RADAR use. In some example, Pulse Doppler RADAR sensor(s) are used.

The RADAR sensor(s) 960 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 960 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 900 surroundings at higher speeds with minimal interference from traffic in adjacent lanes. The other two antennae may expand the field of view, making it possible to quickly detect vehicles entering or leaving the vehicle's 900 lane.

Mid-range RADAR systems may include, as an example, a range of up to 960 m (front) or 80 m (rear), and a field of view of up to 42 degrees (front) or 950 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 900 may further include ultrasonic sensor(s) 962. The ultrasonic sensor(s) 962, which may be positioned at the front, back, and/or the sides of the vehicle 900, may be used for park assist and/or to create and update an occupancy grid. A wide variety of ultrasonic sensor(s) 962 may be used, and different ultrasonic sensor(s) 962 may be used for different ranges of detection (e.g., 2.5 m, 4 m). The ultrasonic sensor(s) 962 may operate at functional safety levels of ASIL B.

The vehicle 900 may include LIDAR sensor(s) 964. The LIDAR sensor(s) 964 may be used for object and pedestrian detection, emergency braking, collision avoidance, and/or other functions. The LIDAR sensor(s) 964 may be functional safety level ASIL B. In some examples, the vehicle 900 may include multiple LIDAR sensors 964 (e.g., two, four, six, etc.) that may use Ethernet (e.g., to provide data to a Gigabit Ethernet switch).

In some examples, the LIDAR sensor(s) 964 may be capable of providing a list of objects and their distances for a 360-degree field of view. Commercially available LIDAR sensor(s) 964 may have an advertised range of approximately 900 m, with an accuracy of 2 cm-3 cm, and with support for a 900 Mbps Ethernet connection, for example. In some examples, one or more non-protruding LIDAR sensors 964 may be used. In such examples, the LIDAR sensor(s) 964 may be implemented as a small device that may be embedded into the front, rear, sides, and/or corners of the vehicle 900. The LIDAR sensor(s) 964, in such examples, may provide up to a 120-degree horizontal and 35-degree vertical field-of-view, with a 200 m range even for low-reflectivity objects. Front-mounted LIDAR sensor(s) 964 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 900. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 964 may be less susceptible to motion blur, vibration, and/or shock.

The vehicle may further include IMU sensor(s) 966. The IMU sensor(s) 966 may be located at a center of the rear axle of the vehicle 900, in some examples. The IMU sensor(s) 966 may include, for example and without limitation, an accelerometer(s), a magnetometer(s), a gyroscope(s), a magnetic compass(es), and/or other sensor types. In some examples, such as in six-axis applications, the IMU sensor(s) 966 may include accelerometers and gyroscopes, while in nine-axis applications, the IMU sensor(s) 966 may include accelerometers, gyroscopes, and magnetometers.

In some embodiments, the IMU sensor(s) 966 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 966 may enable the vehicle 900 to estimate heading without requiring input from a magnetic sensor by directly observing and correlating the changes in velocity from GPS to the IMU sensor(s) 966. In some examples, the IMU sensor(s) 966 and the GNSS sensor(s) 958 may be combined in a single integrated unit.

The vehicle may include microphone(s) 996 placed in and/or around the vehicle 900. The microphone(s) 996 may be used for emergency vehicle detection and identification, among other things.

The vehicle may further include any number of camera types, including stereo camera(s) 968, wide-view camera(s) 970, infrared camera(s) 972, surround camera(s) 974, long-range and/or mid-range camera(s) 998, and/or other camera types. The cameras may be used to capture image data around an entire periphery of the vehicle 900. The types of cameras used depends on the embodiments and requirements for the vehicle 900, and any combination of camera types may be used to provide the necessary coverage around the vehicle 900. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 9A and FIG. 9B.

The vehicle 900 may further include vibration sensor(s) 942. The vibration sensor(s) 942 may measure vibrations of components of the vehicle, such as the axle(s). For example, changes in vibrations may indicate a change in road surfaces. In another example, when two or more vibration sensors 942 are used, the differences between the vibrations may be used to determine friction or slippage of the road surface (e.g., when the difference in vibration is between a power-driven axle and a freely rotating axle).

The vehicle 900 may include an ADAS system 938. The ADAS system 938 may include a SoC, in some examples. The ADAS system 938 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 960, LIDAR sensor(s) 964, and/or a camera(s). The ACC systems may include longitudinal ACC and/or lateral ACC. Longitudinal ACC monitors and controls the distance to the vehicle immediately ahead of the vehicle 900 and automatically adjust the vehicle speed to maintain a safe distance from vehicles ahead. Lateral ACC performs distance keeping, and advises the vehicle 900 to change lanes when necessary. Lateral ACC is related to other ADAS applications such as LCA and CWS.

CACC uses information from other vehicles that may be received via the network interface 924 and/or the wireless antenna(s) 926 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 900), while the I2V communication concept provides information about traffic further ahead. CACC systems may include either or both I2V and V2V information sources. Given the information of the vehicles ahead of the vehicle 900, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 960, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 960, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 900 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 900 if the vehicle 900 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 960, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 900 is backing up. Some RCTW systems include AEB to ensure that the vehicle brakes are applied to avoid a crash. RCTW systems may use one or more rear-facing RADAR sensor(s) 960, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 900, the vehicle 900 itself must, in the case of conflicting results, decide whether to heed the result from a primary computer or a secondary computer (e.g., a first controller 936 or a second controller 936). For example, in some embodiments, the ADAS system 938 may be a backup and/or secondary computer for providing perception information to a backup computer rationality module. The backup computer rationality monitor may run a redundant diverse software on hardware components to detect faults in perception and dynamic driving tasks. Outputs from the ADAS system 938 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 904.

In other examples, ADAS system 938 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 938 may be fed into the primary computer's perception block and/or the primary computer's dynamic driving task block. For example, if the ADAS system 938 indicates a forward crash warning due to an object immediately ahead, the perception block may use this information when identifying objects. In other examples, the secondary computer may have its own neural network which is trained and thus reduces the risk of false positives, as described herein.

The vehicle 900 may further include the infotainment SoC 930 (e.g., an in-vehicle infotainment system (IVI)). Although illustrated and described as a SoC, the infotainment system may not be a SoC, and may include two or more discrete components. The infotainment SoC 930 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 900. For example, the infotainment SoC 930 may radios, disk players, navigation systems, video players, USB and Bluetooth connectivity, carputers, in-car entertainment, Wi-Fi, steering wheel audio controls, hands free voice control, a heads-up display (HUD), an HMI display 934, a telematics device, a control panel (e.g., for controlling and/or interacting with various components, features, and/or systems), and/or other components. The infotainment SoC 930 may further be used to provide information (e.g., visual and/or audible) to a user(s) of the vehicle, such as information from the ADAS system 938, autonomous driving information such as planned vehicle maneuvers, trajectories, surrounding environment information (e.g., intersection information, vehicle information, road information, etc.), and/or other information.

The infotainment SoC 930 may include GPU functionality. The infotainment SoC 930 may communicate over the bus 902 (e.g., CAN bus, Ethernet, etc.) with other devices, systems, and/or components of the vehicle 900. In some examples, the infotainment SoC 930 may be coupled to a supervisory MCU such that the GPU of the infotainment system may perform some self-driving functions in the event that the primary controller(s) 936 (e.g., the primary and/or backup computers of the vehicle 900) fail. In such an example, the infotainment SoC 930 may put the vehicle 900 into a chauffeur to safe stop mode, as described herein.

The vehicle 900 may further include an instrument cluster 932 (e.g., a digital dash, an electronic instrument cluster, a digital instrument panel, etc.). The instrument cluster 932 may include a controller and/or supercomputer (e.g., a discrete controller or supercomputer). The instrument cluster 932 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 930 and the instrument cluster 932. In other words, the instrument cluster 932 may be included as part of the infotainment SoC 930, or vice versa.

Figure 9D:
FIG. 9D is a system diagram for communication between cloud-based server(s) and the example autonomous vehicle of FIG. 9A, in accordance with some embodiments of the present disclosure.

FIG. 9D is a system diagram for communication between cloud-based server(s) and the example autonomous vehicle 900 of FIG. 9A, in accordance with some embodiments of the present disclosure. The system 976 may include server(s) 978, network(s) 990, and vehicles, including the vehicle 900. The server(s) 978 may include a plurality of GPUs 984(A)-984(H) (collectively referred to herein as GPUs 984), PCIe switches 982(A)-982(H) (collectively referred to herein as PCIe switches 982), and/or CPUs 980(A)-980(B) (collectively referred to herein as CPUs 980). The GPUs 984, the CPUs 980, and the PCIe switches may be interconnected with high-speed interconnects such as, for example and without limitation, NVLink interfaces 988 developed by NVIDIA and/or PCIe connections 986. In some examples, the GPUs 984 are connected via NVLink and/or NVSwitch SoC and the GPUs 984 and the PCIe switches 982 are connected via PCIe interconnects. Although eight GPUs 984, two CPUs 980, and two PCIe switches are illustrated, this is not intended to be limiting. Depending on the embodiment, each of the server(s) 978 may include any number of GPUs 984, CPUs 980, and/or PCIe switches. For example, the server(s) 978 may each include eight, sixteen, thirty-two, and/or more GPUs 984.

The server(s) 978 may receive, over the network(s) 990 and from the vehicles, image data representative of images showing unexpected or changed road conditions, such as recently commenced road-work. The server(s) 978 may transmit, over the network(s) 990 and to the vehicles, neural networks 992, updated neural networks 992, and/or map information 994, including information regarding traffic and road conditions. The updates to the map information 994 may include updates for the HD map 922, such as information regarding construction sites, potholes, detours, flooding, and/or other obstructions. In some examples, the neural networks 992, the updated neural networks 992, and/or the map information 994 may have resulted from new training and/or experiences represented in data received from any number of vehicles in the environment, and/or based on training performed at a datacenter (e.g., using the server(s) 978 and/or other servers).

The server(s) 978 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 990, and/or the machine learning models may be used by the server(s) 978 to remotely monitor the vehicles.

In some examples, the server(s) 978 may receive data from the vehicles and apply the data to up-to-date real-time neural networks for real-time intelligent inferencing. The server(s) 978 may include deep-learning supercomputers and/or dedicated AI computers powered by GPU(s) 984, such as a DGX and DGX Station machines developed by NVIDIA. However, in some examples, the server(s) 978 may include deep learning infrastructure that use only CPU-powered datacenters.

The deep-learning infrastructure of the server(s) 978 may be capable of fast, real-time inferencing, and may use that capability to evaluate and verify the health of the processors, software, and/or associated hardware in the vehicle 900. For example, the deep-learning infrastructure may receive periodic updates from the vehicle 900, such as a sequence of images and/or objects that the vehicle 900 has located in that sequence of images (e.g., via computer vision and/or other machine learning object classification techniques). The deep-learning infrastructure may run its own neural network to identify the objects and compare them with the objects identified by the vehicle 900 and, if the results do not match and the infrastructure concludes that the AI in the vehicle 900 is malfunctioning, the server(s) 978 may transmit a signal to the vehicle 900 instructing a fail-safe computer of the vehicle 900 to assume control, notify the passengers, and complete a safe parking maneuver.

For inferencing, the server(s) 978 may include the GPU(s) 984 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 10:
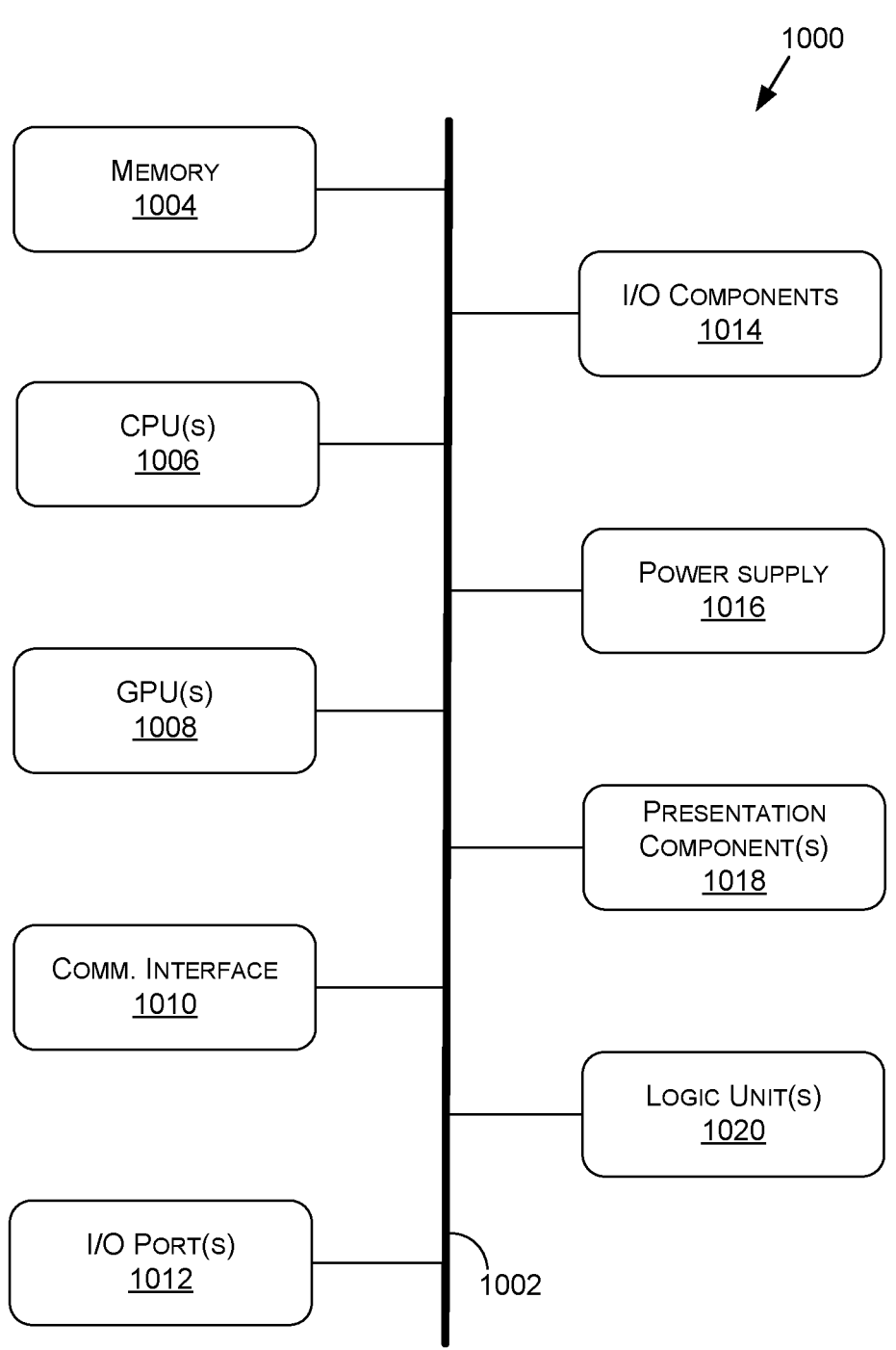
FIG. 10 is a block diagram of an example computing device suitable for use in implementing some embodiments of the present disclosure.

FIG. 10 is a block diagram of an example computing device(s) 1000 suitable for use in implementing some embodiments of the present disclosure. Computing device 1000 may include an interconnect system 1002 that directly or indirectly couples the following devices: memory 1004, one or more central processing units (CPUs) 1006, one or more graphics processing units (GPUs) 1008, a communication interface 1010, input/output (I/O) ports 1012, input/output components 1014, a power supply 1016, one or more presentation components 1018 (e.g., display(s)), and one or more logic units 1020. In at least one embodiment, the computing device(s) 1000 may comprise one or more virtual machines (VMs), and/or any of the components thereof may comprise virtual components (e.g., virtual hardware components). For non-limiting examples, one or more of the GPUs 1008 may comprise one or more vGPUs, one or more of the CPUs 1006 may comprise one or more vCPUs, and/or one or more of the logic units 1020 may comprise one or more virtual logic units. As such, a computing device(s) 1000 may include discrete components (e.g., a full GPU dedicated to the computing device 1000), virtual components (e.g., a portion of a GPU dedicated to the computing device 1000), or a combination thereof.

Although the various blocks of FIG. 10 are shown as connected via the interconnect system 1002 with lines, this is not intended to be limiting and is for clarity only. For example, in some embodiments, a presentation component 1018, such as a display device, may be considered an I/O component 1014 (e.g., if the display is a touch screen). As another example, the CPUs 1006 and/or GPUs 1008 may include memory (e.g., the memory 1004 may be representative of a storage device in addition to the memory of the GPUs 1008, the CPUs 1006, and/or other components). In other words, the computing device of FIG. 10 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 10.

The interconnect system 1002 may represent one or more links or busses, such as an address bus, a data bus, a control bus, or a combination thereof. The interconnect system 1002 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1006 may be directly connected to the memory 1004. Further, the CPU 1006 may be directly connected to the GPU 1008. Where there is direct, or point-to-point connection between components, the interconnect system 1002 may include a PCIe link to carry out the connection. In these examples, a PCI bus need not be included in the computing device 1000.

The memory 1004 may include any of a variety of computer-readable media. The computer-readable media may be any available media that may be accessed by the computing device 1000. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1004 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1000. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1006 may be configured to execute at least some of the computer-readable instructions to control one or more components of the computing device 1000 to perform one or more of the methods and/or processes described herein. The CPU(s) 1006 may each include one or more cores (e.g., one, two, four, eight, twenty-eight, seventy-two, etc.) that are capable of handling a multitude of software threads simultaneously. The CPU(s) 1006 may include any type of processor, and may include different types of processors depending on the type of computing device 1000 implemented (e.g., processors with fewer cores for mobile devices and processors with more cores for servers). For example, depending on the type of computing device 1000, the processor may be an Advanced RISC Machines (ARM) processor implemented using Reduced Instruction Set Computing (RISC) or an x86 processor implemented using Complex Instruction Set Computing (CISC). The computing device 1000 may include one or more CPUs 1006 in addition to one or more microprocessors or supplementary co-processors, such as math co-processors.

In addition to or alternatively from the CPU(s) 1006, the GPU(s) 1008 may be configured to execute at least some of the computer-readable instructions to control one or more components of the computing device 1000 to perform one or more of the methods and/or processes described herein. One or more of the GPU(s) 1008 may be an integrated GPU (e.g., with one or more of the CPU(s) 1006 and/or one or more of the GPU(s) 1008 may be a discrete GPU. In embodiments, one or more of the GPU(s) 1008 may be a coprocessor of one or more of the CPU(s) 1006. The GPU(s) 1008 may be used by the computing device 1000 to render graphics (e.g., 3D graphics) or perform general purpose computations. For example, the GPU(s) 1008 may be used for General-Purpose computing on GPUs (GPGPU). The GPU(s) 1008 may include hundreds or thousands of cores that are capable of handling hundreds or thousands of software threads simultaneously. The GPU(s) 1008 may generate pixel data for output images in response to rendering commands (e.g., rendering commands from the CPU(s) 1006 received via a host interface). The GPU(s) 1008 may include graphics memory, such as display memory, for storing pixel data or any other suitable data, such as GPGPU data. The display memory may be included as part of the memory 1004. The GPU(s) 1008 may include two or more GPUs operating in parallel (e.g., via a link). The link may directly connect the GPUs (e.g., using NVLINK) or may connect the GPUs through a switch (e.g., using NVSwitch). When combined together, each GPU 1008 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1006 and/or the GPU(s) 1008, the logic unit(s) 1020 may be configured to execute at least some of the computer-readable instructions to control one or more components of the computing device 1000 to perform one or more of the methods and/or processes described herein. In embodiments, the CPU(s) 1006, the GPU(s) 1008, and/or the logic unit(s) 1020 may discretely or jointly perform any combination of the methods, processes and/or portions thereof. One or more of the logic units 1020 may be part of and/or integrated in one or more of the CPU(s) 1006 and/or the GPU(s) 1008 and/or one or more of the logic units 1020 may be discrete components or otherwise external to the CPU(s) 1006 and/or the GPU(s) 1008. In embodiments, one or more of the logic units 1020 may be a coprocessor of one or more of the CPU(s) 1006 and/or one or more of the GPU(s) 1008.

Examples of the logic unit(s) 1020 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1010 may include one or more receivers, transmitters, and/or transceivers that enable the computing device 1000 to communicate with other computing devices via an electronic communication network, included wired and/or wireless communications. The communication interface 1010 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1020 and/or communication interface 1010 may include one or more data processing units (DPUs) to transmit data received over a network and/or through interconnect system 1002 directly to (e.g., a memory of) one or more GPU(s) 1008.

The I/O ports 1012 may enable the computing device 1000 to be logically coupled to other devices including the I/O components 1014, the presentation component(s) 1018, and/or other components, some of which may be built in to (e.g., integrated in) the computing device 1000. Illustrative I/O components 1014 include a microphone, mouse, keyboard, joystick, game pad, game controller, satellite dish, scanner, printer, wireless device, etc. The I/O components 1014 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1000. The computing device 1000 may be include depth cameras, such as stereoscopic camera systems, infrared camera systems, RGB camera systems, touchscreen technology, and combinations of these, for gesture detection and recognition. Additionally, the computing device 1000 may include accelerometers or gyroscopes (e.g., as part of an inertia measurement unit (IMU)) that enable detection of motion. In some examples, the output of the accelerometers or gyroscopes may be used by the computing device 1000 to render immersive augmented reality or virtual reality.

The power supply 1016 may include a hard-wired power supply, a battery power supply, or a combination thereof. The power supply 1016 may provide power to the computing device 1000 to enable the components of the computing device 1000 to operate.

The presentation component(s) 1018 may include a display (e.g., a monitor, a touch screen, a television screen, a heads-up-display (HUD), other display types, or a combination thereof), speakers, and/or other presentation components. The presentation component(s) 1018 may receive data from other components (e.g., the GPU(s) 1008, the CPU(s) 1006, DPUs, etc.), and output the data (e.g., as an image, video, sound, etc.).

Example Data Center

Figure 11:
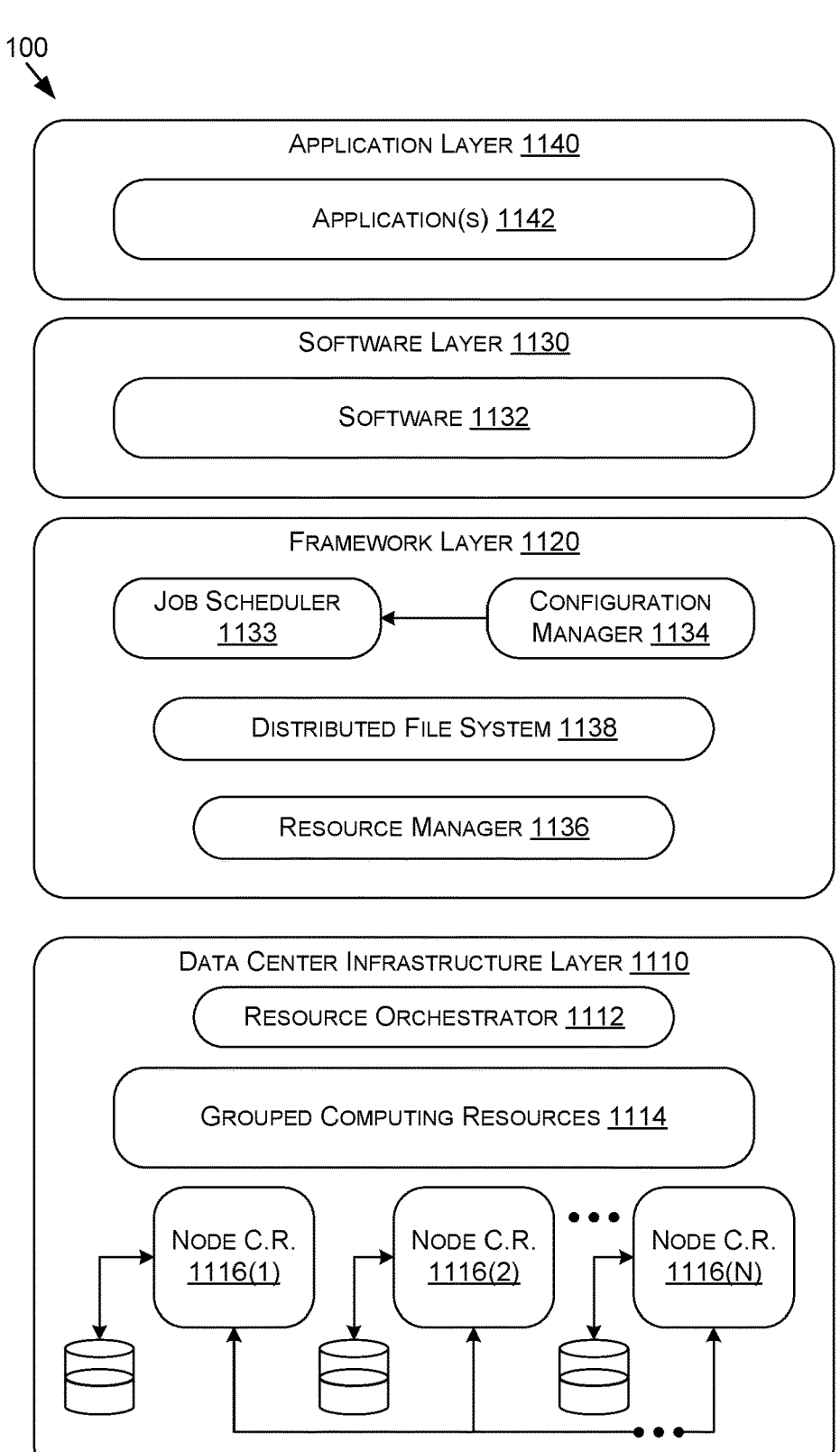
FIG. 11 is a block diagram of an example data center suitable for use in implementing some embodiments of the present disclosure.

FIG. 11 illustrates an example data center 1100 that may be used in at least one embodiments of the present disclosure. The data center 1100 may include a data center infrastructure layer 1110, a framework layer 1120, a software layer 1130, and/or an application layer 1140.

As shown in FIG. 11, the data center infrastructure layer 1110 may include a resource orchestrator 1112, grouped computing resources 1114, and node computing resources ("node C.R.s") 1116(1)-1116(N), where "N" represents any whole, positive integer. In at least one embodiment, node C.R.s 1116(1)-1116(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1116(1)-1116(N) may correspond to a server having one or more of the above-mentioned computing resources. In addition, in some embodiments, the node C.R.s 1116(1)-11161(N) may include one or more virtual components, such as vGPUs, vCPUs, and/or the like, and/or one or more of the node C.R.s 1116(1)-1116(N) may correspond to a virtual machine (VM).

In at least one embodiment, grouped computing resources 1114 may include separate groupings of node C.R.s 1116 housed within one or more racks (not shown), or many racks housed in data centers at various geographical locations (also not shown). Separate groupings of node C.R.s 1116 within grouped computing resources 1114 may include grouped compute, network, memory or storage resources that may be configured or allocated to support one or more workloads. In at least one embodiment, several node C.R.s 1116 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1112 may configure or otherwise control one or more node C.R.s 1116(1)-1116(N) and/or grouped computing resources 1114. In at least one embodiment, resource orchestrator 1112 may include a software design infrastructure (SDI) management entity for the data center 1100. The resource orchestrator 1112 may include hardware, software, or some combination thereof.

In at least one embodiment, as shown in FIG. 11, framework layer 1120 may include a job scheduler 1133, a configuration manager 1134, a resource manager 1136, and/or a distributed file system 1138. The framework layer 1120 may include a framework to support software 1132 of software layer 1130 and/or one or more application(s) 1142 of application layer 1140. The software 1132 or application(s) 1142 may respectively include web-based service software or applications, such as those provided by Amazon Web Services, Google Cloud and Microsoft Azure. The framework layer 1120 may be, but is not limited to, a type of free and open-source software web application framework such as Apache Spark™ (hereinafter "Spark") that may utilize distributed file system 1138 for large-scale data processing (e.g., "big data"). In at least one embodiment, job scheduler 1133 may include a Spark driver to facilitate scheduling of workloads supported by various layers of data center 1100. The configuration manager 1134 may be capable of configuring different layers such as software layer 1130 and framework layer 1120 including Spark and distributed file system 1138 for supporting large-scale data processing. The resource manager 1136 may be capable of managing clustered or grouped computing resources mapped to or allocated for support of distributed file system 1138 and job scheduler 1133. In at least one embodiment, clustered or grouped computing resources may include grouped computing resource 1114 at data center infrastructure layer 1110. The resource manager 1136 may coordinate with resource orchestrator 1112 to manage these mapped or allocated computing resources.

In at least one embodiment, software 1132 included in software layer 1130 may include software used by at least portions of node C.R.s 1116(1)-1116(N), grouped computing resources 1114, and/or distributed file system 1138 of framework layer 1120. One or more types of software may include, but are not limited to, Internet web page search software, e-mail virus scan software, database software, and streaming video content software.

In at least one embodiment, application(s) 1142 included in application layer 1140 may include one or more types of applications used by at least portions of node C.R.s 1116(1)-1116(N), grouped computing resources 1114, and/or distributed file system 1138 of framework layer 1120. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1134, resource manager 1136, and resource orchestrator 1112 may implement any number and type of self-modifying actions based on any amount and type of data acquired in any technically feasible fashion. Self-modifying actions may relieve a data center operator of data center 1100 from making possibly bad configuration decisions and possibly avoiding underutilized and/or poor performing portions of a data center.

The data center 1100 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1100. In at least one embodiment, trained or deployed machine learning models corresponding to one or more neural networks may be used to infer or predict information using resources described above with respect to the data center 1100 by using weight parameters calculated through one or more training techniques, such as but not limited to those described herein.

In at least one embodiment, the data center 1100 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1000 of FIG. 10—e.g., each device may include similar components, features, and/or functionality of the computing device(s) 1000. In addition, where backend devices (e.g., servers, NAS, etc.) are implemented, the backend devices may be included as part of a data center 1100, an example of which is described in more detail herein with respect to FIG. 11.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1000 described herein with respect to FIG. 10. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. One or more processors comprising processing circuitry to:
   operate an image processing pipeline of an ego-machine in a first imaging switching mode that toggles between an RGB imaging mode and an infrared (IR) imaging mode at a fixed rate; and
   based at least on a speed or a state of the ego-machine, switch to operating the image processing pipeline in a second imaging switching mode that toggles between the RGB imaging mode and the IR imaging mode based at least on an amount of detected light intensity;
   select, while operating in at least one individual imaging switching mode of the first imaging switching mode or the second imaging switching mode, one or more machine learning models that are applicable to the at least one individual imaging switching mode from a plurality of supported machine learning models; and
   perform one or more detection tasks using the one or more machine learning models.

2. The one or more processors of claim 1, wherein the processing circuitry is further to switch, based at least on detecting that the speed of the ego-machine is above a threshold, to operating the image processing pipeline in the first imaging switching mode that toggles between the RGB imaging mode and the IR imaging mode at the fixed rate.

3. The one or more processors of claim 1, wherein the processing circuitry is further to switch, based at least on determining that the state engaged by the ego-machine is a drive gear, to operating the image processing pipeline in the first imaging switching mode that toggles between the RGB imaging mode and the IR imaging mode at the fixed rate.

4. The one or more processors of claim 1, wherein the processing circuitry is further to operate the image processing pipeline in the first imaging switching mode based at least on generating one or more frames of RGB image data and one or more frames of IR image data, and determining whether to perform at least one detection task of the one or more detection tasks on the one or more frames of RGB image data or on the one or more frames of IR image data based at least on a second amount of detected light intensity.

5. The one or more processors of claim 1, wherein the processing circuitry is further to operate the image processing pipeline in the first imaging switching mode based at least on generating and applying first image data to a first set of the plurality of supported machine learning models, and operate the image processing pipeline in the second imaging switching mode based at least on generating and applying second image data to a second set of the plurality of supported machine learning models that is different from the first set.

6. The one or more processors of claim 1, wherein the processing circuitry is further to operate the image processing pipeline in the second imaging switching mode based at least on generating and applying a representation of one or more RGB image frames to a first set of the plurality of supported machine learning models, and generating and applying a representation of one or more IR image frames to a second set of the plurality of supported machine learning models that is different from the first set.

7. The one or more processors of claim 1, wherein the processing circuitry is further to operate the image processing pipeline in the first imaging switching mode based at least on generating and applying a representation of one or more RGB image frames and one or more IR image frames to at least one individual machine learning model of the plurality of supported machine learning models.

8. The one or more processors of claim 1, wherein the processing circuitry is further to operate the image processing pipeline in the first imaging switching mode based at least on using a common sensor to generate one or more IR image frames and one or more RGB image frames, monitor an operator of the ego-machine based at least on executing a first detection task of the one or more detection tasks using the one or more IR image frames generated by the common sensor, and monitor a non-operator occupant of the ego-machine based at least on executing a second detection task of the one or more detection tasks using the one or more RGB image frames generated by the common sensor.

9. The one or more processors of claim 1, wherein the processing circuitry is further to:
   based at least on the ego-machine being in a state corresponding to a rate of velocity below a designated threshold, operate the image processing pipeline in the first imaging switching mode to generate first image data and perform at least one of child presence detection, three-dimensional (3D) pose estimation, or monocular depth estimation of the one or more detection tasks on the first image data; and
   based at least on the ego-machine being in motion, operate the image processing pipeline in the second imaging switching mode to generate second image data and perform at least one of driver distraction detection, driver drowsiness detection, driver hands on wheel detection, driver 3D pose estimation, occupant pose estimation, or monocular depth estimation of the one or more detection tasks on the second image data.

10. The one or more processors of claim 1, wherein the one or more processors are comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system for performing remote operations;

a system for performing real-time streaming;

a system for generating or presenting one or more of augmented reality content, virtual reality content, or mixed reality content;

a system implemented using an edge device;

a system implemented using a robot;

a system for performing conversational AI operations;

a system implementing one or more language models;

a system implementing one or more large language models (LLMs);

a system for generating synthetic data;

a system for generating synthetic data using AI;

a system incorporating one or more virtual machines (VMs);

a system implemented at least partially in a data center; or a system implemented at least partially using cloud computing resources.

11. A system comprising one or more hardware processors to:

switch, by an image processing pipeline, between a first switching mode that produces infrared (IR) illumination at a fixed rate, and a second switching mode that produces the IR illumination at a dynamic rate determined based at least on an amount of detected light intensity;

select, while operating in at least one individual switching mode of the first switching mode or the second switching mode, one or more machine learning models from a plurality of supported machine learning models based at least on the at least one individual switching mode being in operation; and execute one or more detection tasks using the one or more machine learning models.

12. The system of claim 11, wherein the one or more hardware processors are further to switch, based at least on detecting that a speed of an ego-machine associated with the image processing pipeline is above a threshold, to operating the image processing pipeline in the first switching mode that produces the IR illumination at the fixed rate.

13. The system of claim 11, wherein the one or more hardware processors are further to switch, based at least on detecting that a speed of an ego-machine associated with the image processing pipeline is below a threshold, to operating the image processing pipeline in the second switching mode that produces the IR illumination at the dynamic rate.

14. The system of claim 11, wherein, in the first switching mode, the one or more hardware processors are further to generate one or more frames of RGB image data and one or more frames of IR image data, and determine whether to perform at least one detection task of the one or more detection tasks on the one or more frames of RGB image data or on the one or more frames of IR image data based at least on a second amount of detected light intensity.

15. The system of claim 11, wherein, in the first switching mode, the one or more hardware processors are further to generate and apply first image data to a first set of the plurality of supported machine learning models, wherein, in the second switching mode, the one or more hardware processors are further to generate and apply second image data to a second set of the plurality of supported machine learning models that is different from the first set.

16. The system of claim 11, wherein, in the second switching mode, the one or more hardware processors are further to generate and apply a representation of one or more RGB image frames to a first set of the plurality of supported machine learning models, and generate and apply a representation of one or more IR image frames to a second set of the plurality of supported machine learning models that is different from the first set.

17. The system of claim 11, wherein, in the first switching mode, the one or more hardware processors are further to generate and apply a representation of one or more RGB image frames and one or more IR image frames to at least one individual machine learning model of the plurality of supported machine learning models.

18. The system of claim 11, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system for performing real-time streaming;

a system for generating or presenting one or more of augmented reality content, virtual reality content, or mixed reality content;

a system implemented using an edge device;

a system implemented using a robot;

a system for performing conversational AI operations;

a system implementing one or more language models;

a system implementing one or more large language models (LLMs);

a system for generating synthetic data;

a system for generating synthetic data using AI;

a system incorporating one or more virtual machines (VMs);

a system implemented at least partially in a data center; or a system implemented at least partially using cloud computing resources.

19. A method comprising:

operating an image processing pipeline of an ego-machine that switches, based at least on a speed or an active gear of the ego-machine, between a first switching mode that causes infrared (IR) illumination to be produced at a fixed rate and a second switching mode that causes the IR illumination to be produced at a dynamic rate based at least on an amount of detected light intensity; and selecting, while operating in at least one individual switching mode of the first switching mode or the second switching mode, one or more machine learning models from a plurality of supported machine learning models based at least on the at least one individual switching mode being active.

20. The method of claim 19, wherein the method is performed by at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system for performing real-time streaming;

a system for generating or presenting one or more of augmented reality content, virtual reality content, or mixed reality content;

a system implemented using an edge device;

a system implemented using a robot;

a system for performing conversational AI operations;

a system implementing one or more language models;

a system implementing one or more large language models (LLMs);

a system for generating synthetic data;

a system for generating synthetic data using AI;

a system incorporating one or more virtual machines (VMs);

a system implemented at least partially in a data center; or a system implemented at least partially using cloud computing resources.

* * * * *